(12) United States Patent  
Emori et al.

(10) Patent No.: US 9,754,559 B2
(45) Date of Patent: Sep. 5, 2017

(54) IMAGE PROCESSING APPARATUS

(71) Applicants: Mototsugu Emori, Saitama (JP); Tomoyuki Tsukuda, Kanagawa (JP)

(72) Inventors: Mototsugu Emori, Saitama (JP); Tomoyuki Tsukuda, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/480,955

(22) Filed: Sep. 9, 2014

(65) Prior Publication Data
US 2015/0091940 A1 Apr. 2, 2015

(30) Foreign Application Priority Data

Sep. 27, 2013 (JP) .................................. 2013-201034

(51) Int. Cl.
G09G 5/00 (2006.01)
G09G 5/377 (2006.01)
G06F 3/0354 (2013.01)
G06F 3/14 (2006.01)
H04L 12/18 (2006.01)
(Continued)

(52) U.S. Cl.
CPC ......... *G09G 5/377* (2013.01); *G06F 3/03545* (2013.01); *G06F 3/14* (2013.01); *H04L 12/1813* (2013.01); *H04L 12/1831* (2013.01); *H04N 1/00204* (2013.01); *G06F 3/0488* (2013.01);
(Continued)

(58) Field of Classification Search
CPC combination set(s) only.
See application file for complete search history.

(56) References Cited

U.S. PATENT DOCUMENTS 5,781,662 A * 7/1998 Mori .................... G06F 3/04883
382/186
5,790,114 A * 8/1998 Geaghan ............... G06F 3/0488
178/18.03

(Continued)

FOREIGN PATENT DOCUMENTS

JP 9-91081 4/1997
JP 9-106321 4/1997
(Continued)

OTHER PUBLICATIONS

Office Action cited in Japanese Patent Application No. 2013-201034 on Sep. 13, 2016.

*Primary Examiner* — M Good Johnson
(74) *Attorney, Agent, or Firm* — Oblon, McClelland, Maier & Neustadt, L.L.P.

(57) ABSTRACT

An image processing apparatus having a display device displaying a background image and a stroke image superimposed on the background image, the stroke image reproducing a stroke which is drawn by an input operation of a user, includes a recording unit recording image data of the background image and stroke data, which are related to the stroke input by the input operation, into an electronic document; a read unit reading the electronic document; a display unit displaying the background image on the display device by using the image data of the background data, reproducing the stroke image by using the stroke data, and displaying the stroke image superimposed on the background image on the display device; and an edit unit editing the stroke data in accordance with the input operation.

10 Claims, 21 Drawing Sheets

LAYER OF UI IMAGE (A)

LAYER OF STROKE IMAGE (B)

LAYER OF OUTPUT IMAGE (C)

LAYER OF BACKGROUND IMAGE (D)

(51) Int. Cl.
*H04N 1/00* (2006.01)
*G06F 3/0488* (2013.01)
*G09G 1/07* (2006.01)

(52) U.S. Cl.
CPC ............ *G06F 3/1454* (2013.01); *G09G 1/07* (2013.01); *G09G 2340/10* (2013.01)

(56) References Cited

U.S. PATENT DOCUMENTS

| | | | | |
|---|---|---|---|---|
| 6,130,962 A * | 10/2000 | Sakurai | ............... | H04N 1/00127 358/403 |
| 6,278,445 B1 | 8/2001 | Tanaka et al. | | |
| 6,311,328 B1 * | 10/2001 | Miyazaki | ............... | G06T 3/4007 340/670 |
| 6,326,957 B1 * | 12/2001 | Nathan | ................. | G06F 3/0488 345/173 |
| 6,388,654 B1 * | 5/2002 | Platzker | .................. | G06F 3/033 345/1.2 |
| 6,999,061 B2 | 2/2006 | Hara | ................... | G06F 3/04883 178/18.01 |
| 7,171,056 B2 * | 1/2007 | Zhang | ..................... | G06K 9/32 382/266 |
| 7,176,890 B2 * | 2/2007 | Kitaguchi | ............ | G06F 1/1601 345/158 |
| 7,337,389 B1 * | 2/2008 | Woolf | ................... | G06F 17/241 345/629 |
| 7,633,654 B2 * | 12/2009 | Morichika | ............ | H04N 1/393 358/471 |
| 7,707,274 B2 | 4/2010 | Umehara et al. | | |
| 7,747,951 B2 * | 6/2010 | Croft | .................... | G06F 17/211 345/619 |
| 7,770,116 B2 * | 8/2010 | Zhang | ............... | G06F 17/30843 345/619 |
| 7,792,927 B2 | 9/2010 | Umehara et al. | | |
| 7,880,719 B2 * | 2/2011 | Kritt | ....................... | G06K 9/22 345/156 |
| 7,991,774 B2 | 8/2011 | Takatsu et al. | | |
| 8,237,958 B2 | 8/2012 | Emori | | |
| 8,239,398 B2 | 8/2012 | Takatsu et al. | | |
| 8,275,197 B2 * | 9/2012 | Hawkins | ........... | G06K 9/00402 382/165 |
| 8,345,277 B2 | 1/2013 | Emori | | |
| 8,526,037 B2 | 9/2013 | Emori et al. | | |
| 8,631,421 B2 | 1/2014 | Takatsu et al. | | |
| 8,707,176 B2 * | 4/2014 | Muto | ................... | G11B 27/105 709/204 |
| 2003/0077561 A1 * | 4/2003 | Alsop | ..................... | B43L 1/00 434/408 |
| 2007/0075990 A1 | 4/2007 | Sahashi et al. | | |
| 2007/0120871 A1 * | 5/2007 | Okamoto | ........... | G06F 3/04855 345/619 |
| 2007/0124420 A1 | 5/2007 | Imai et al. | | |
| 2011/0083102 A1 * | 4/2011 | Adachi | ................. | G06F 3/0481 715/800 |
| 2011/0175929 A1 * | 7/2011 | Tanaka | ................. | G06Q 10/101 345/629 |
| 2012/0206471 A1 * | 8/2012 | Sarnoff | .................... | G06T 11/60 345/581 |
| 2012/0278738 A1 * | 11/2012 | Kruse | ..................... | G06Q 10/10 715/754 |
| 2013/0198653 A1 * | 8/2013 | Tse | ........................ | G06F 3/0484 715/751 |
| 2013/0290416 A1 * | 10/2013 | Nelson | .................. | G06Q 10/10 709/204 |
| 2014/0223386 A1 * | 8/2014 | Huang | ................. | G06F 3/04883 715/863 |
| 2014/0320540 A1 * | 10/2014 | Deach | ....................... | G06T 3/40 345/666 |
| 2014/0380193 A1 * | 12/2014 | Coplen | ............... | G06F 3/04847 715/753 |
| 2015/0019961 A1 * | 1/2015 | Won | ....................... | G06F 17/242 715/268 |
| 2015/0030249 A1 * | 1/2015 | Zhen | ....................... | G06F 3/018 382/186 |
| 2015/0154442 A1 * | 6/2015 | Takahashi | ............. | G06K 9/222 345/156 |
| 2015/0169975 A1 * | 6/2015 | Kienzle | .................... | G06K 9/34 382/189 |

FOREIGN PATENT DOCUMENTS

| | | |
|---|---|---|
| JP | 2004-500635 | 1/2004 |
| JP | 2004-280602 | 10/2004 |
| JP | 2005-149097 | 6/2005 |
| JP | 2006-091033 | 4/2006 |
| JP | 2008-097371 | 4/2008 |
| JP | 2012-003711 | 1/2012 |

\* cited by examiner

FIG.5

| PAGE DATA ID | START TIME | END TIME | STROKE LAYOUT DATA ID | MEDIUM DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

FIG.8

| MEDIUM DATA ID | DATA TYPE | RECORDED TIME | X COORDINATE VALUE | Y COORDINATE VALUE | WIDTH | HEIGHT | IMAGE DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

FIG.9

| PRODUCT ID | LICENSE ID | EXPIRATION DATE |
|---|---|---|
| 1001 | 12345678abcdefgh | 2012/12/31 |
| 1001 | 4321dcba8765hgfe | - |
| ... | ... | ... |

FIG.13

| IDENTIFICATION CODE | STORAGE PERIOD | STORED DATE AND TIME | No. OF PAGES | SIZE | FILE PATH |
|---|---|---|---|---|---|
| 8930 | 7 | 20130716132412 | 10 | 24,120 | C:¥Users¥cbsuser¥AppData¥Roaming¥Ricoh¥IWB¥IWBMeetingFiles¥8930¥iwb-20130716-132412.pdf |
| 1092 | 7 | 20130715143610 | 4 | 10,454 | C:¥Users¥cbsuser¥AppData¥Roaming¥Ricoh¥IWB¥IWBMeetingFiles¥1092¥iwb-20130715-143610.pdf |
| 9892 | 5 | 20130713102110 | 21 | 49,847 | C:¥Users¥cbsuser¥AppData¥Roaming¥Ricoh¥IWB¥IWBMeetingFiles¥9892¥iwb-20130713-102110.pdf |
| ... | ... | ... | ... | ... | ... |

FIG.16

| NAME | MAIL ADDRESS |
|---|---|
| TARO | taro@alpha.co.jp |
| HANAKO | hanako@beta.co.jp |
| - | jiro@gamma.co.jp |
| ⋮ | ⋮ |

FIG.17

| |
|---|
| iwb-20130610104423.pdf |
| iwb-20130625152245.pdf |
| iwb-20130628113418.pdf |
| ⋮ |

FIG.18

| NAME | IP ADDRESS |
|---|---|
| CONFERENCE ROOM 1 | 192.0.0.1 |
| CONFERENCE ROOM 2 | 192.0.0.2 |
| - | 192.0.0.3 |
| ⋮ | ⋮ |

FIG.19

| NAME | IP ADDRESS |
|---|---|
| CONFERENCE ROOM 1 | 192.0.0.1 |
| CONFERENCE ROOM 2 | 192.0.0.2 |
| - | 192.0.0.8 |
| ⋮ | ⋮ |

FIG.21

| SEQ | OPERATION NAME | IP ADDRESS AND PORT NO. OF TRANSMISSION SOURCE | IP ADDRESS AND PORT NO. OF TRANSMISSION DESTINATION | OPERATION TYPE | OPERATION TARGET (PAGE DATA ID/ STROKE DATA ID) | DATA |
|---|---|---|---|---|---|---|
| 1 | ADD | 192.0.0.1: 50001 | 192.0.0.1: 50000 | STROKE | p005 | ·····(STROKE DATA) |
| 2 | ADD | 192.0.0.1: 50000 | 192.0.0.2: 50001 | STROKE | p005 | ·····(STROKE DATA) |
| 3 | UPDATE | 192.0.0.2: 50001 | 192.0.0.1: 50000 | STROKE | s006 | (50, 40) |
| 4 | UPDATE | 192.0.0.1: 50000 | 192.0.0.1: 50001 | STROKE | s006 | (50, 40) |
| 5 | DELETE | 192.0.0.2: 50001 | 192.0.0.1: 50000 | STROKE | s007 | — |
| 6 | DELETE | 192.0.0.1: 50000 | 192.0.0.1: 50001 | STROKE | s007 | — |
| 7 | ADD | 192.0.0.1: 50001 | 192.0.0.1: 50000 | PAGE | — | — |
| 8 | ADD | 192.0.0.1: 50000 | 192.0.0.2: 50001 | PAGE | — | — |
| 9 | ADD | 192.0.0.2: 50001 | 192.0.0.1: 50000 | IMAGE | p006 | rico.jpg |
| 10 | ADD | 192.0.0.1: 50000 | 192.0.0.1: 50001 | IMAGE | p006 | rico.jpg |
| ... | ... | ... | ... | ... | ... | ... |

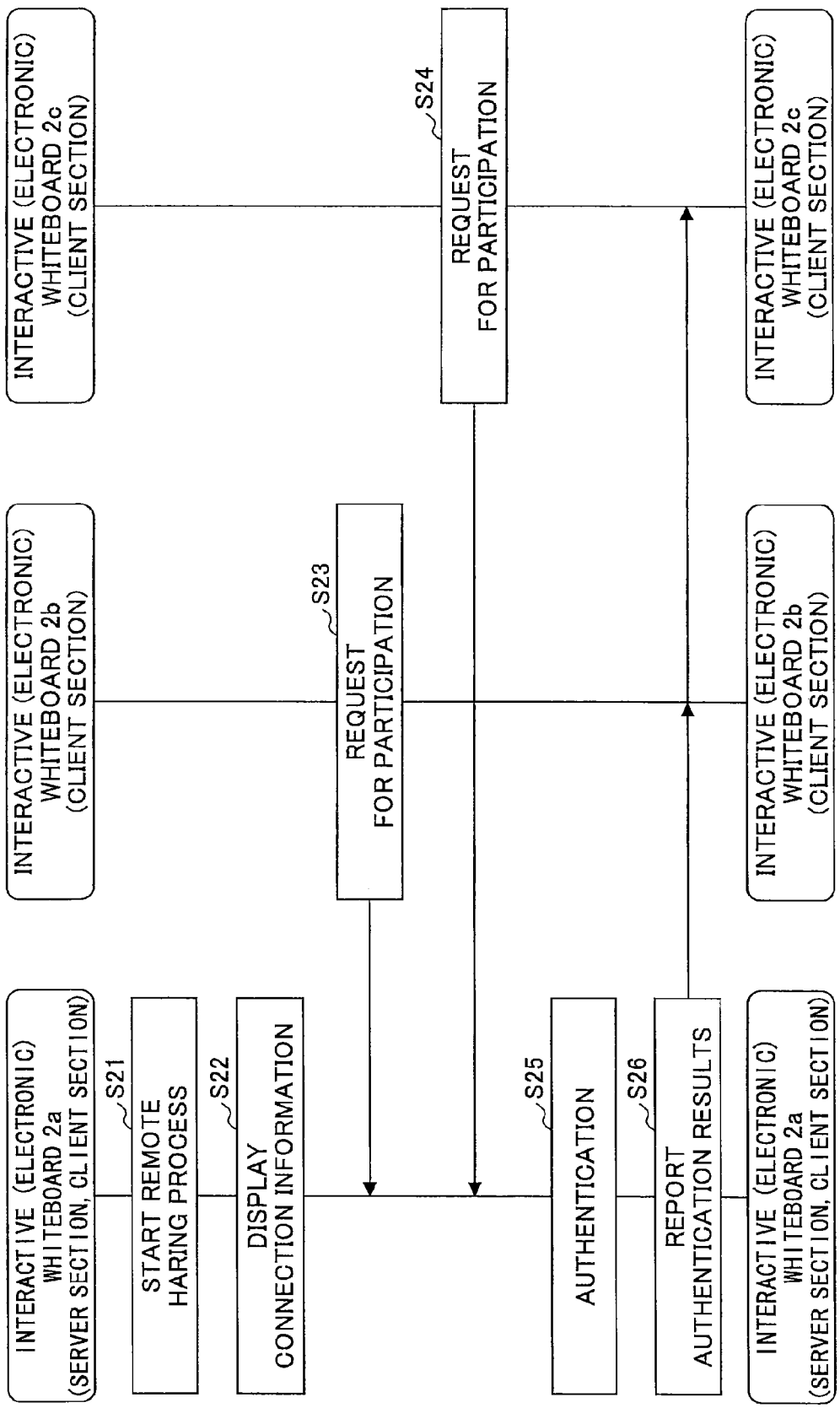

IMAGE PROCESSING APPARATUS

CROSS-REFERENCE TO RELATED APPLICATIONS

The present application is based on and claims the benefit of priority under 35 U.S.C §119 of Japanese Patent Application No. 2013-201034 filed Sep. 27, 2013, the entire contents of which are hereby incorporated herein by reference.

BACKGROUND OF THE INVENTION

1. Field of the Invention

The present invention generally relates to an image processing apparatus displaying a background image on a display, and further displays a stroke image, which is drawn by a user's input operation, to be superimposed on the displayed background image.

2. Description of the Related Art

Recently, an image processing apparatus displaying a background image on a large display further displays a stroke image including characters, figures, symbols etc., drawn by a user, so that the stroke image is superimposed on the background image (a.k.a "interactive (electronic) whiteboard") has become widely used in, for example, companies, educational institutions, and administrative organizations.

As an example of such an interactive (electronic) whiteboard, Japanese Laid-open Patent Publication No. 2008-97371 discloses an electronic information board system which includes a display device to display an image and a computing device to control the display device. Here, the display device is equipped with a touch panel. In the electronic information board system, it is possible for the computing device to detect a stroke which is drawn by a user on a background image displayed on the display device. Further, the computing device reproduces (displays) the stroke as an image (stroke image) to be superimposed on the background image displayed on the display device. The background image and the stroke image displayed on the display device are combined as a single image (combined image) to be stored in a recording medium such as a UBS memory in an image format such as a BMP format.

SUMMARY OF THE INVENTION

According to an aspect of the present invention, an image processing apparatus having a display device displaying a background image and a stroke image superimposed on the background image, the stroke image reproducing a stroke which is drawn by an input operation of a user, includes a recording unit recording image data of the background image and stroke data, which are related to the stroke input by the input operation, into an electronic document;

a read unit reading the electronic document;

a display unit displaying the background image on the display device by using the image data of the background data, reproducing the stroke image by using the stroke data, and displaying the stroke image superimposed on the background image on the display device; and an edit unit editing the stroke data in accordance with the input operation.

BRIEF DESCRIPTION OF THE DRAWINGS

Other objects, features, and advantages of the present invention will become more apparent from the following description when read in conjunction with the accompanying drawings, in which:

FIG. 5 is a conceptual diagram of example page data;

FIG. 8 is a conceptual diagram of example medium data;

FIG. 9 is a conceptual diagram of an example remote license management table;

FIG. 13 is a conceptual diagram of an example management table of a temporarily stored file;

FIG. 16 is a conceptual diagram of an example address book management table;

FIG. 17 is a conceptual diagram of example backup data;

FIG. 18 is a conceptual diagram of an example connection destination management table;

FIG. 19 is a conceptual diagram of an example participation location management table;

FIG. 21 is a conceptual diagram of example operation data;

FIG. 22 is a sequence diagram of an example flow of starting a remote sharing process and a participating process;

DETAILED DESCRIPTION OF THE PREFERRED EMBODIMENTS

In an electronic information board system of related technologies, it is possible to secondarily use (e.g., processing, editing, printing, etc.) a combined image stored in a recording medium. However, it is not possible to further edit (re-edit) the stroke image by, for example, adding, deleting, and changing the stroke image which is combined with the background image as the combined image.

The present invention is made in light of the problem and may provide an electronic information board system (image processing apparatus) capable of re-editing a stroke image previously generated.

For an image processing apparatus according to an embodiment, by having a structure described in detail below, it becomes possible to reproduce a stroke which is drawn by a user's operation based on the stroke data thereof, display the stroke on a display device, and perform processing on the stroke by editing the stroke data by performing an input operation on the stroke data.

In the following, an embodiment of the present invention is described with reference to FIGS. 1 through 25.

First, the outline of an image processing system 1 is described.

Figure 1:
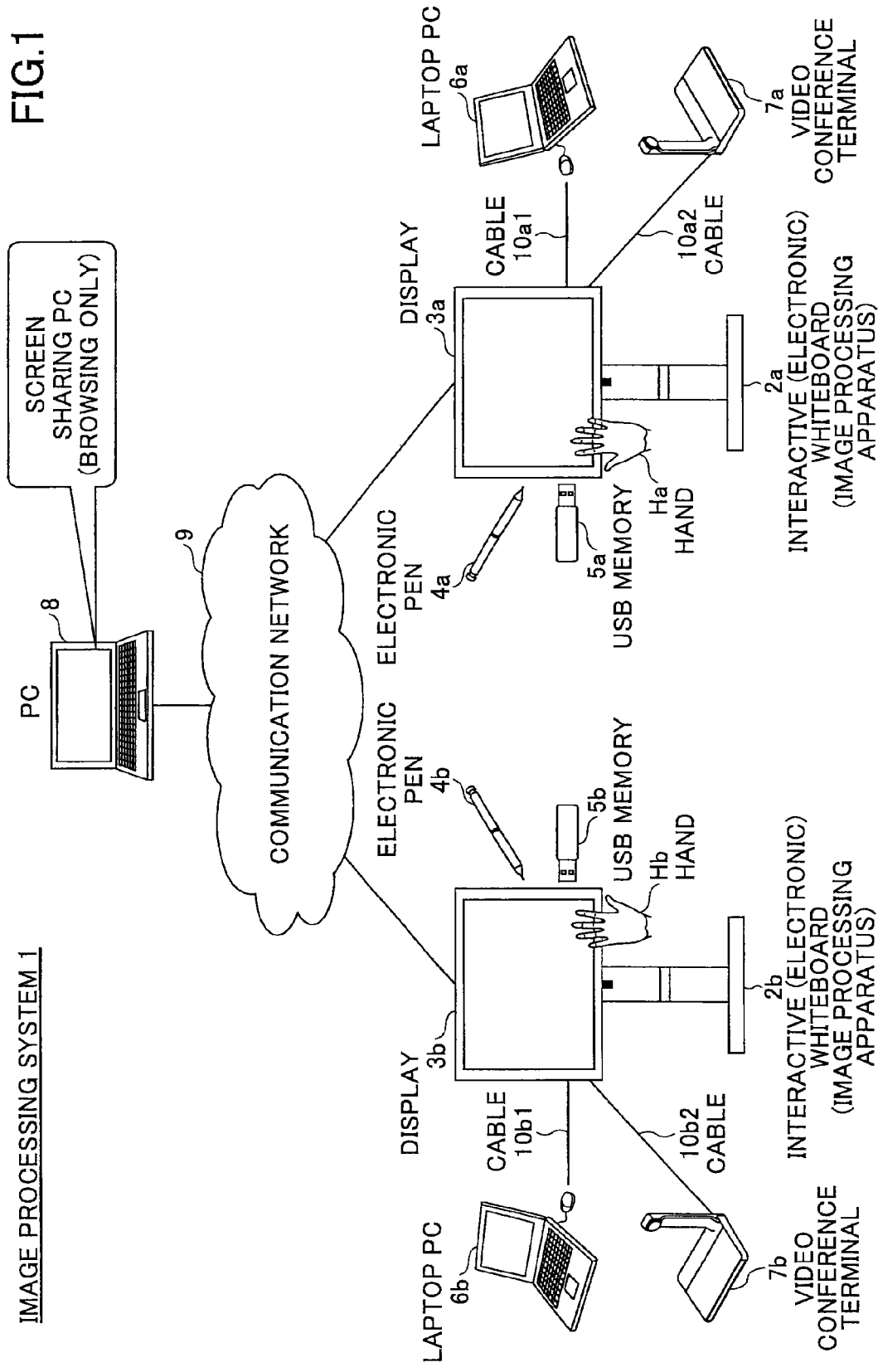
FIG. 1 illustrates an example configuration of an image processing system according to an embodiment.

FIG. 1 illustrates an example configuration of the image processing system 1 according to an embodiment. As illustrated in FIG. 1, the image processing system 1 includes plural (in the example of FIG. 1, two) interactive (electronic) whiteboards 2a and 2b and a Personal Computer (PC) 8 which are communicably connected to each other via a communication network 9. In the present invention, it should be noted that the number of the interactive (electronic) whiteboards is not limited to two. Namely, the image processing system 1 according to an embodiment may include three or more interactive (electronic) whiteboards.

The interactive (electronic) whiteboards 2a (2b) include displays 3a (3b). This description denotes that the interactive (electronic) whiteboards 2a and 2b include displays 3a and 3b, respectively. In the following, this description method is used, and the repeated description of this description method is omitted. For example, the displays 3a (3b) are equipped with electronic pens 4a (4b) and USB memories 5a (5b). Further, for example, the interactive (electronic) whiteboards 2a (2b) are connected to laptop PCs 6a (6b) and video conference terminals 7a (7b).

Figure 4:
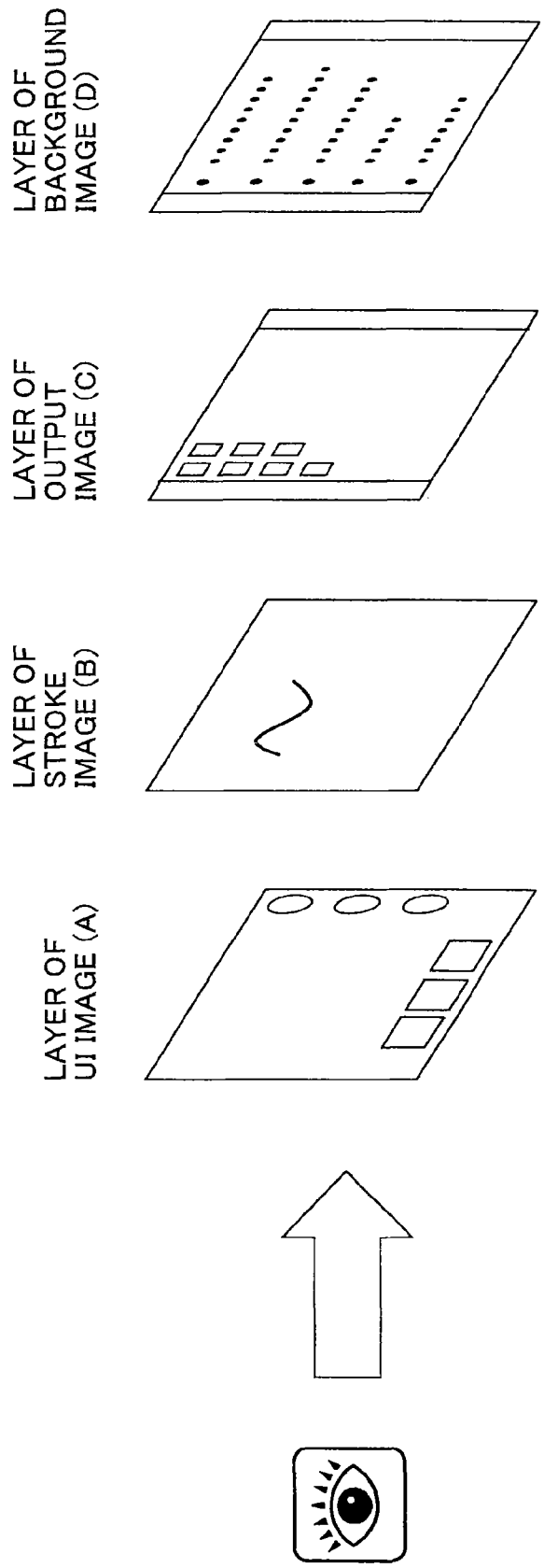
FIG. 4 illustrates an example configuration of an image layer.

The displays 3a (3b) are a multi-layer displays having plural display panels (layers) formed in a layered manner, so that plural layers can display the respective different images to display a single image including plural images superimposed on each other to a user (see FIG. 4).

Further, the displays 3a (3b) can detect an event where, for example, pen tips or pen tails of the electronic pens 4a (4b) touch the screens of the displays 3a (3b), and display images drawn based on the events on the screens of the displays 3a (3b). The displays 3a (3b) can further detect gestures of user's hands Ha (Hb) such as flicking and pinching, so as to zoom in, zoom out, and turn a page of (change) the image.

It is possible to connect the USB memories 5a (5b) to the displays 3a (3b). By doing this, it becomes possible to read and write a PDF file or the like from and to the USB memories 5a (5b).

The laptop PCs 6a (6b) are connected to the interactive (electronic) whiteboards 2a (2b) via cables 10a1 (10b1) for communications supporting standards such as the DisplayPort, the Digital Visual Interface (DVI), High-Definition Multimedia Interface (HDMI) (registered trademark), Video Graphics Array (VGA) and the like. By connecting in this way, it becomes possible to transmit the event information (detection result of the event) detected by the displays 3a (3b) to the laptop PCs 6a (6b).

Further, the video conference terminals 7a (7b) are also connected to the interactive (electronic) whiteboards 2a (2b) via cables 10a2 (10b2) for communications supporting the similar standards. Here, the laptop PCs 6a (6b) and/or video conference terminals 7a (7b) may be wirelessly connected to the interactive (electronic) whiteboards 2a (2b) using wireless communication in compliance with one of various wireless communication protocols including, for example, Bluetooth (registered trademark).

In the image processing system 1 having the configuration described above, by mutual communication between the interactive (electronic) whiteboards 2a and 2b via the communication network 9, it becomes possible to display an image, which is drawn on the display 3a of the interactive (electronic) whiteboard 2a, on the display 3b of the interactive (electronic) whiteboard 2b. Also, it becomes possible to display an image, which is drawn on the display 3b of the interactive (electronic) whiteboard 2b, on the display 3a of the interactive (electronic) whiteboards 2a. As described, in the image processing system 1, it is possible to perform a remote sharing process that is a process to share the same image between the interactive (electronic) whiteboards 2a and 2b which are remotely located from each other.

In the following description, the term "interactive (electronic) whiteboard 2" denotes any of the plural (two) interactive (electronic) whiteboards (2a and 2b). In the same manner, the terms "display 3", "electronic pen 4", "USB memory 5", "laptop PC 6", "video conference terminal 7", "hand H", and "cable 10" are used.

A hardware configuration of the interactive (electronic) whiteboard 2 is described with reference to FIG. 2.

Figure 2:
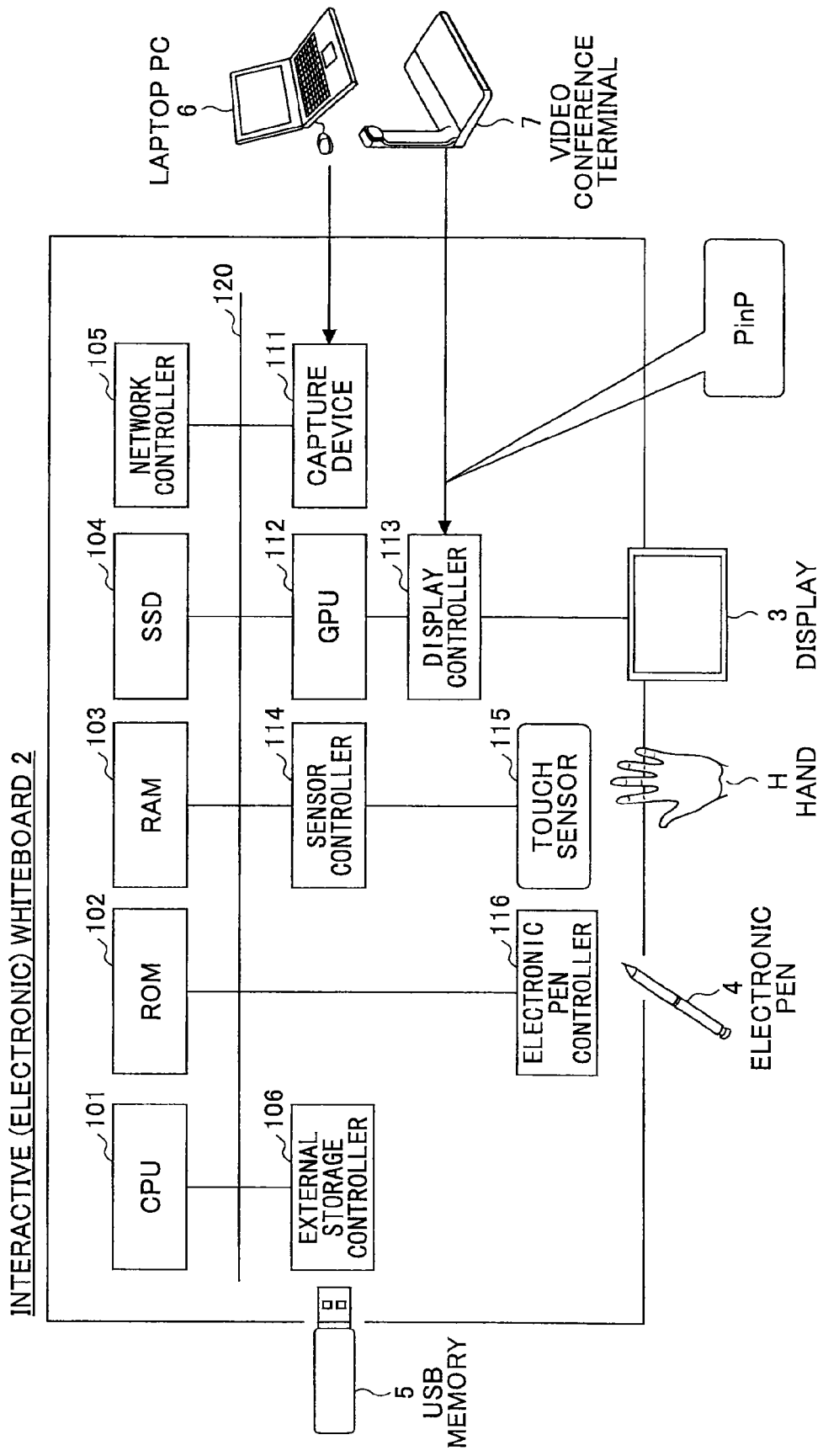
FIG. 2 is an example hardware configuration of an interactive (electronic) whiteboard.

FIG. 2 illustrates an example hardware configuration of the interactive (electronic) whiteboard 2. As illustrated in FIG. 2, the interactive (electronic) whiteboard 2 includes a Central Processing Unit (CPU) 101, a Read-Only Memory (ROM) 102, a Random Access memory (RAM) 103, a Solid State Drive (SSD) 104, a network controller 105, an external storage controller 106, a capture device 111, a Graphic Processing Unit (GPU) 112, a display controller 113, a touch sensor 115, a sensor controller 114, and an electronic pen controller 116.

The CPU 101 controls overall operations of the interactive (electronic) whiteboard 2. The ROM 102 stores programs including, for example, an Initial Program Loader (IPL) used for driving the CPU 101. The RAM 103 is used as a working area for the CPU 101. The SSD 104 stores various data such as programs. The network controller 105 controls the communications with other interactive (electronic) whiteboard 2 and the like via the communication network 9 (see FIG. 1). The external storage controller 106 controls communications with the USB memory 5 connected to the display 3. The capture device 111 displays image information on the display of the laptop PC 6 as a still image or a moving image.

The GPU 112 performs necessary image data processing on the graphics. The display controller 113 controls and manages screen display to display an output image from the GPU 112 on, for example, the display 3 and the video conference terminal 7. The touch sensor 115 detects touching of, for example, the electronic pen 4 and the user's hand H onto the display 3. The sensor controller 114 controls the touch sensor 115. The electronic pen controller 116 communicates with the electronic pen 4 to detect the touching of the electronic pen 4 onto the display 3.

Among the above elements, the CPU 101, the ROM 102, the RAM 103, the SSD 104, the network controller 105, the external storage controller 106, the capture device 111, the GPU 112, the sensor controller 114, and the electronic pen controller 116 are connected to a bus line 120 including an address bus and a data bus for electrical connections.

The touch sensor 115 employs an infrared scanning method (hereinafter may also be referred to as an "infrared interruption detection method") to detect an input operation onto the display 3 by using the electronic pen 4 or the like and the corresponding positional coordinates. In the infrared interruption detection method, for example, two light emitting and receiving devices (not shown) are disposed on respective end parts on the upper side of the display 3. Those light emitting and receiving devices emit plural infrared light beams, which are parallel to each other, to the screen and receive the infrared light beams reflected by a reflection member disposed around the screen.

Here, when the electronic pen 4 or the like touches onto the screen, one of the light paths of the infrared light beams from each of the two light emitting and receiving devices is interrupted, so that the two light emitting and receiving devices detect the interruption of the respective infrared light beams. The touch sensor 115 identifies the interrupted infrared light beams, and outputs the identification (ID) thereof to the sensor controller 114. Based on the received ID, the sensor controller 114 identifies the touching (i.e., the input operation) by the electronic pen 4 or the like and the corresponding positional coordinates.

Here, note that the detecting method by the touch sensor 115 is not limited to the infrared interruption detection method. Namely, the touch sensor 115 may alternatively employ another method using, for example, a touch panel using an electric capacitance method identifying the input operation and the positional coordinate are identified by detecting a change of electric capacitance, a touch panel using a resistance film method detecting a voltage change of two resistance films facing each other, or a touch panel using an electromagnetic induction method detecting electromagnetic induction occurred between the dedicated electronic pen and the screen.

Here, as described above, it is assumed that the electronic pen controller 116 detects the touching of the pen tip or the pen tail of the electronic pen 4 onto the display 3. However, the present invention is not limited to this configuration. Namely, for example, the electronic pen controller 116 may detect the touching of the grip part or another part of the electronic pen 4 onto the display 3.

Further, the various data such as the programs to be recorded in the SSD 104 as described above may alternatively be recorded in another recording medium such as a Compact Disc ROM (CD-ROM).

Next, an example functional configuration of the interactive (electronic) whiteboard 2 is described. The interactive (electronic) whiteboard 2 serves as not only a "host device" which initially starts the remote sharing process but also a "participation device" which participates afterwards in the remote sharing process that has already been started.

Figure 3:
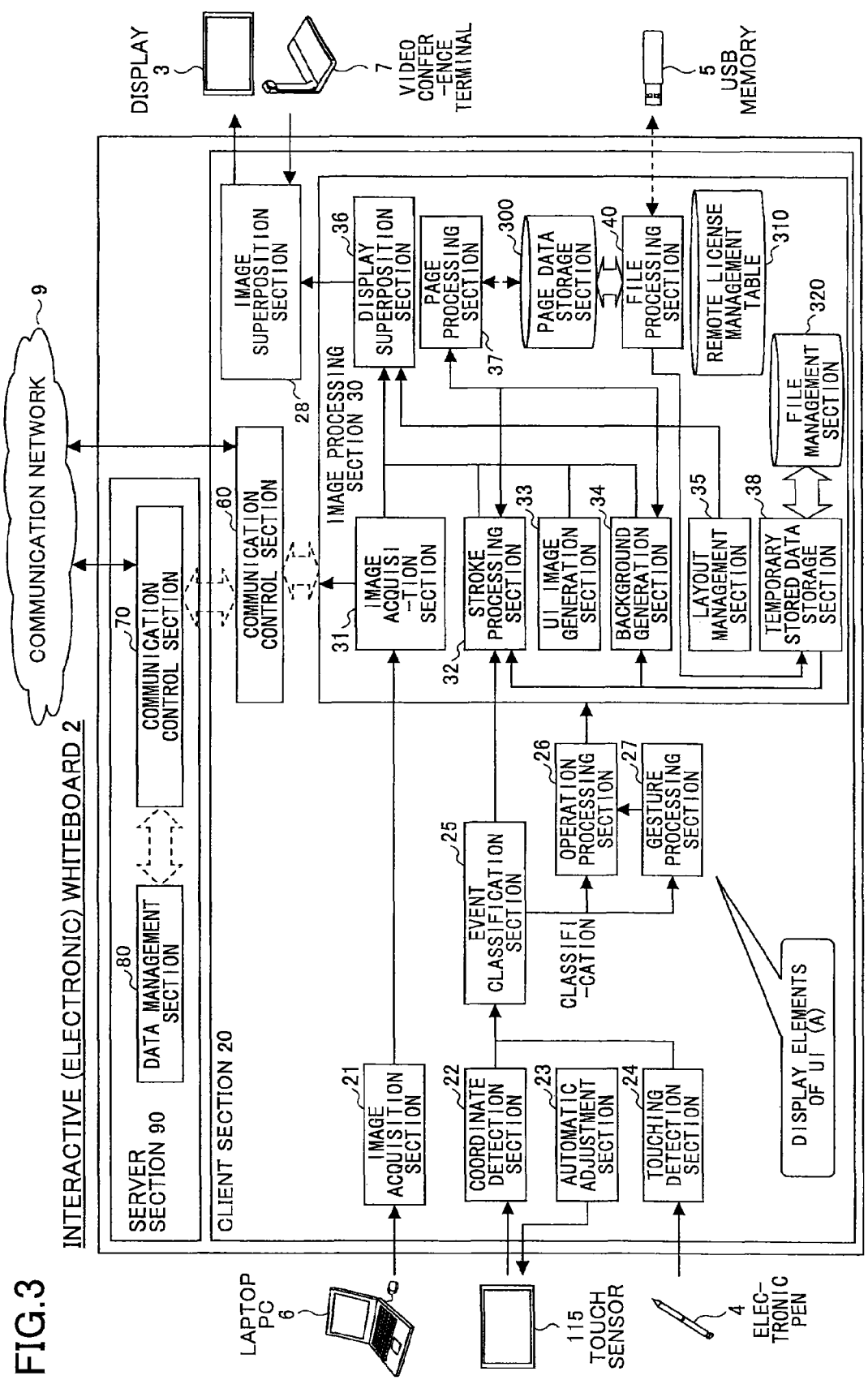
FIG. 3 is an example functional block diagram of the interactive (electronic) whiteboard.

FIG. 3 illustrates an example overall functional configuration of the interactive (electronic) whiteboard 2. The functions of the interactive (electronic) whiteboard 2 can be broadly divided into two parts; those of a client section 20 and those of a server section 90. Those functions can be realized by a set (combination) of the elements of the hardware configuration described above and the programs (see FIG. 2).

Here, the server section 90 hosts the remote sharing process by providing a service including information necessary for the remote sharing process to the client section 20 via a network. On the other hand, the client section 20 participates in the remote sharing process by receiving the service related to the remote sharing process from the server section 90.

The interactive (electronic) whiteboard 2 according to an embodiment includes both the functions of the client section 20 and the functions of the server section 90. Accordingly, both of the interactive (electronic) whiteboards 2a and 2b can serve as not only the host device but also the participation device. However, in the interactive (electronic) whiteboard 2 serving as the host device, both the functions of the client section 20 and the functions of the server section 90 are started. On the other hand, in the interactive (electronic) whiteboard 2 serving as the participation device, only the functions of the client section 20 are started.

Therefore, for example, in a case where the interactive (electronic) whiteboard 2a serves as the host device and the interactive (electronic) whiteboard 2b serves as the participation device, in the remote sharing process, the server section 90 in the interactive (electronic) whiteboard 2a provides the service related to the process, the client section 20 in the interactive (electronic) whiteboard 2a communicates with the client section 20 in the interactive (electronic) whiteboard 2b via the server section 90 in the interactive (electronic) whiteboard 2a and the client section 20 in the interactive (electronic) whiteboard 2b communicates with the client section 20 in the interactive (electronic) whiteboard 2a via the server section 90 in the interactive (electronic) whiteboard 2a.

The functional configuration of the client section 20 is described. As illustrated in FIG. 3, the client section 20 includes an image acquisition section 21, a coordinate detection section 22, an automatic adjustment section 23, a touching detection section 24, an event classification section 25, an operation processing section 26, a gesture processing section 27, an image superposition section 28, an image processing section 30, and a communication control section 60.

The image acquisition section 21 acquires an output image (image signal) from an image output device such as the laptop PC 6 connected to the interactive (electronic) whiteboard 2 via the cable 10. Further, the image acquisition section 21 analyzes the acquired image signal to extract image information indicating, for example, the resolution of the display image (image frame) and the frequency of update. The image acquisition section 21 outputs the acquired image signal and the image information to the image processing section 30 (an image acquisition section 31)

The coordinate detection section 22 detects the positional coordinate of an event (e.g., the touching of the pen tip or the pen tail of the electronic pen 4 onto the display 3) generated by a user. Further, the coordinate detection section 22 calculates the area of the touched area on the display 3. The results of the detection are output to the event classification section 25.

The automatic adjustment section 23 is started up when the interactive (electronic) whiteboard 2 starts up, and adjusts various parameters for signal processing in the infrared scanning method by the touch sensor 115 so that the coordinate detection section 22 can detect the positional coordinates of an event such as touching with sufficient resolution.

The touching detection section 24 detects the event (e.g., the touching of the pen tip or the pen tail of the electronic pen 4 on the display 3) generated by a user, and outputs the detection result to the event classification section 25.

Based on the positional coordinates of the event detected by the coordinate detection section 22, the event classification section 25 classifies the event detected by the touching detection section 24 into one of a stroke drawing, a User Interface (UI) operation, and a gesture operation, and outputs the classification result to one of the image processing section 30 (a stroke processing section 32), the operation processing section 26, and the gesture processing section 27 based on the classification result.

The term "stroke drawing" herein refers to an event that, when a stroke image (B) described below is displayed on the display 3, a user draws a stroke (line drawing) on the display 3 by pressing down the electronic pen 4 onto the display 3, sliding the electronic pen 4 on the display 3 while the electronic pen 4 is being pressed down on the display 3, and separating the electronic pen 4 from the display 3. Note that the "stroke drawing" refers to not only the event to draw a stroke but also other events such as to delete a stroke which is already drawn and edit a drawn stroke.

The term "UI operation" refers to an event that, when a UI image (A) described below is displayed on the display 3, a user presses down a predetermined position on the UI image (A) with the electronic pen 4, the hand H or the like. By the UI operation, it becomes possible to set, for example, the color and the width of the line to be drawn with the electronic pen 4.

The term "gesture operation" refers to an event that, when the stroke image (B) described below is displayed on the display 3, a user performs a gesture such as flicking and pinching by touching the display 3 with the hand H of the user and sliding the hand H on the display 3. By the gesture operation, it becomes possible to, for example, zoom in (or zoom out) the image, change a display area, and turn a page.

The operation processing section 26 receives the event that is determined as the UI operation by the event classification section 25, and performs the corresponding operation based on an element of the UI relevant to the received event. As the element of the UI, there are, for example, a button, a list, a check box, and a text box.

The gesture processing section 27 receives the event that is determined as the gesture operation by the event classification section 25, and performs the corresponding operation (e.g., to zoom in or zoom out the image, change a display area, and turn a page).

The image superposition section 28 displays an image that is superimposed (laid out) by the image processing section 30 (a display superposition section 36) on the display 3. Further, for example, the image superposition section 28 displays the image transmitted from an image output device (e.g., the laptop PC 6) via the image processing section 30 on the entire display 3 and further displays the image transmitted from another image output device (e.g., the video conference terminal 7) on a part of the display 3 (this display method is called "picture in picture" display). The image superposition section 28 switches the display so that, for example, the "picture in picture" display is to be displayed on the entire display 3.

The image processing section 30 performs a superimposing process on the images (image layers); The image processing section 30 includes the image acquisition section 31, the stroke processing section 32, a UI image generation section 33, a background generation section 34, a layout management section 35, the display superposition section 36, a page processing section 37, a file processing section 40, a temporary stored data storage section 38, a page data storage section 300, a remote license management table 310, and a file management section 320.

The image acquisition section 31 acquires the frame data, as the image, that are included in the output image acquired by the image acquisition section 21, and output the frame data, as the images, to the display superposition section 36. The image corresponds to the output image (C) from the image output device (e.g., the laptop PC 6) in FIG. 4.

The stroke processing section 32 receives the event that is determined as the stroke drawing (drawing of the stroke by using the electronic pen 4 and the hand H) by the event classification section 25. Then, the stroke processing section 32 generates, deletes, and edits the image which reproduces the stroke ("stroke image"), and outputs the image data and the stroke data to the display superposition section 36 and the page processing section 37. The image drawn by the stroke corresponds to the stroke image (B) in FIG. 4. Further, the stroke processing section 32 can read the stroke data via the page processing section 37, and generate, delete, and edit the stroke image again by using the stroke data. Here, the results of the generated, deleted, and edited stroke image are stored in an operation data storage section 840 as operation data.

The UI image generation section 33 generates a UI image previously set in the interactive (electronic) whiteboard 2, and outputs the UI image to the display superposition section 36. Here, the UI image corresponds to the UI image (A) in FIG. 4.

The background generation section 34 generates a background image to be displayed on the display 3, and outputs the background image to the display superposition section 36 and the page processing section 37. Further, as described below, the background generation section 34 receives the background image included in the page data read from the page data storage section 300 by the page processing section 37. Here, the background image corresponds to the background image (D) in FIG. 4. The pattern of the background image includes, for example, a solid color, grid-pattern display, etc.

The layout management section 35 manages the information related to the layout ("layout information") which indicates how to lay out the output image (C) and the stroke image (B), which are output from the image acquisition section 31 and the stroke processing section 32, respectively, relative to the UI image (A) and the background image (D), which are output from the UI image generation section 33 and the background generation section 34, respectively. The layout information is output to the display superposition section 36.

Based on the layout information output from the layout management section 35, the display superposition section 36 lays out the UI image (A) output from the UI image generation section 33, the stroke image (B) output from the stroke processing section 32, the output image (C) output from the image acquisition section 31, and the background image (D) output from the background generation section 34, and sequentially displays those images (A) through (D) in the first through fourth display panels (layers), respectively, from the front (user's) side of the display 3. By doing this, those four images are displayed in an overlapped manner in the order of the UI image (A), the stroke image (B), the output image (C), and the background image (D) from the user's side.

Further, when appropriate, based on the layout information output from the layout management section 35, the display superposition section 36 may control so as not to display the output image (C) and/or the background image (D). For example, when the connection to an image output device (e.g., the laptop PC 6) is cut off, the output image (C) is set not to be displayed and the UI image (A), the stroke image (B), and the background image (D) are set to be displayed in three panels (i.e., in the first, the second, and the fourth panels, respectively, from the front (user's) side) of the display 3. By doing this, those three images are displayed in an overlapped manner in the order of the UI image (A), the stroke image (B), and the background image (D) from the user's side. Further, the display superposition section 36 performs processes to enlarge, reduce, and move the display area of an image.

The page processing section 37 combines (the image data and the stroke data of) the stroke image (B) output from the stroke processing section 32 and the background image (D)

output from the background generation section 34 on a page-by-page basis into the respective page data, and stores the page data into the page data storage section 300. Further, the page processing section 37 reads the stored page data, and outputs the page data to the stroke processing section 32, so that (the stroke data of) the stroke image (B) included in the paged data can be re-edited, and to the background generation section 34, so that the background image (D) included in the page data can be re-displayed on the display 3. Further, the page processing section 37 deletes and makes a copy of the stored (recorded) page data.

FIG. 5 illustrates an example of page data. The page data herein refers to data for one page. That is, the page data include "stroke layout data" (a set of stroke data) which is to be used to display the stroke image (B), described below, on the display and "medium data" which is to be used to display the background image (D), described below, on the display 3. Here, the page data include a page data ID to identify the page, a time when the display of the page is started ("display time"), a time when the update of the page is ended due to, for example, a stroke or a gesture ("end time"), a stroke layout data ID to identify the stroke layout data generated by a stroke by using, for example, the electronic pen 4 or the hand H, and an medium data ID to identify the medium data.

Figure 6:
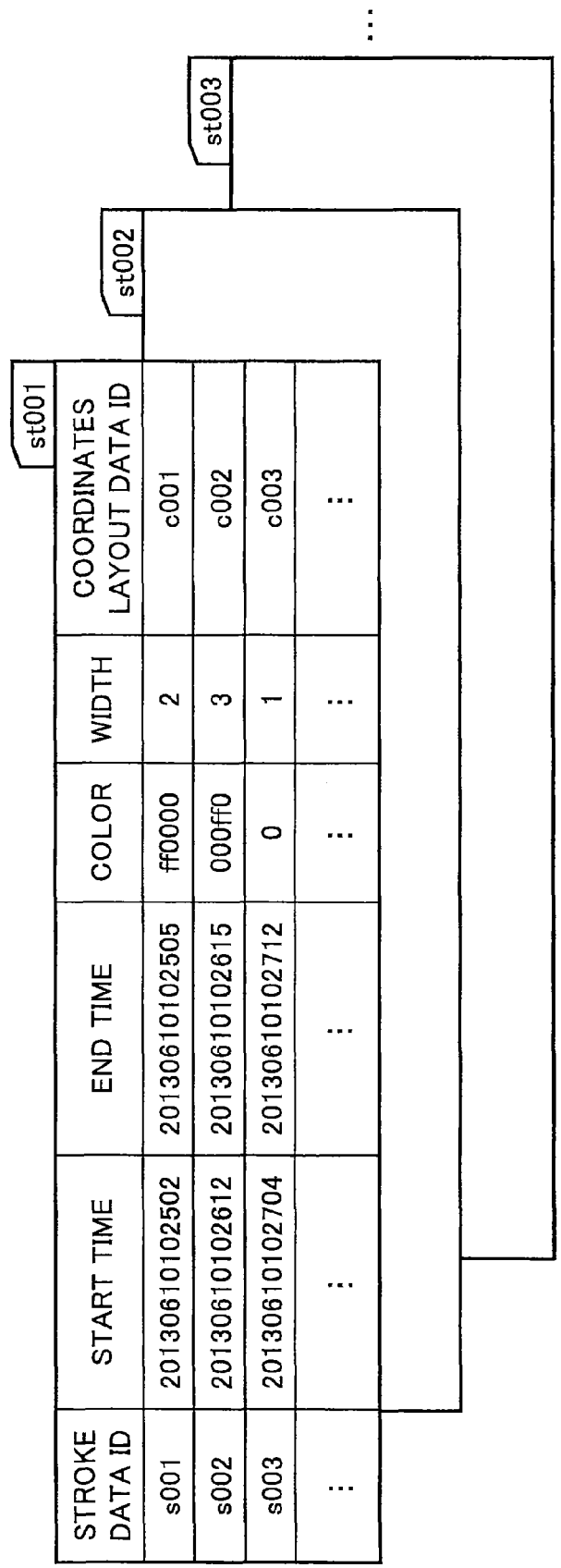
FIG. 6 is a conceptual diagram of example stroke data.

FIG. 6 illustrates an example of stroke layout data. A set of stroke layout data includes plural sets of stroke data. A set of stroke data is generated based on a stroke drawn by, for example, the electronic pen 4. In this regard, for example, when an alphabetical letter "S" is drawn, one stroke is required (used). In this case, a set of stroke data is required (used) to reproduce the stroke. On the other hand, when an alphabetical letter "T" is drawn, two strokes are required (used). In this case, two sets of stroke data are required (used) to reproduce those two strokes.

Each set of the stroke data includes a stroke data ID to identify the stroke data, a time when the writing of the stroke is started ("start time"), a time when the writing of the stroke is ended ("end time"), the color of the stroke, the width of the stroke, and a coordinate layout data ID to identify coordinate layout data including information indicating the pass points of the stroke.

Figure 7:
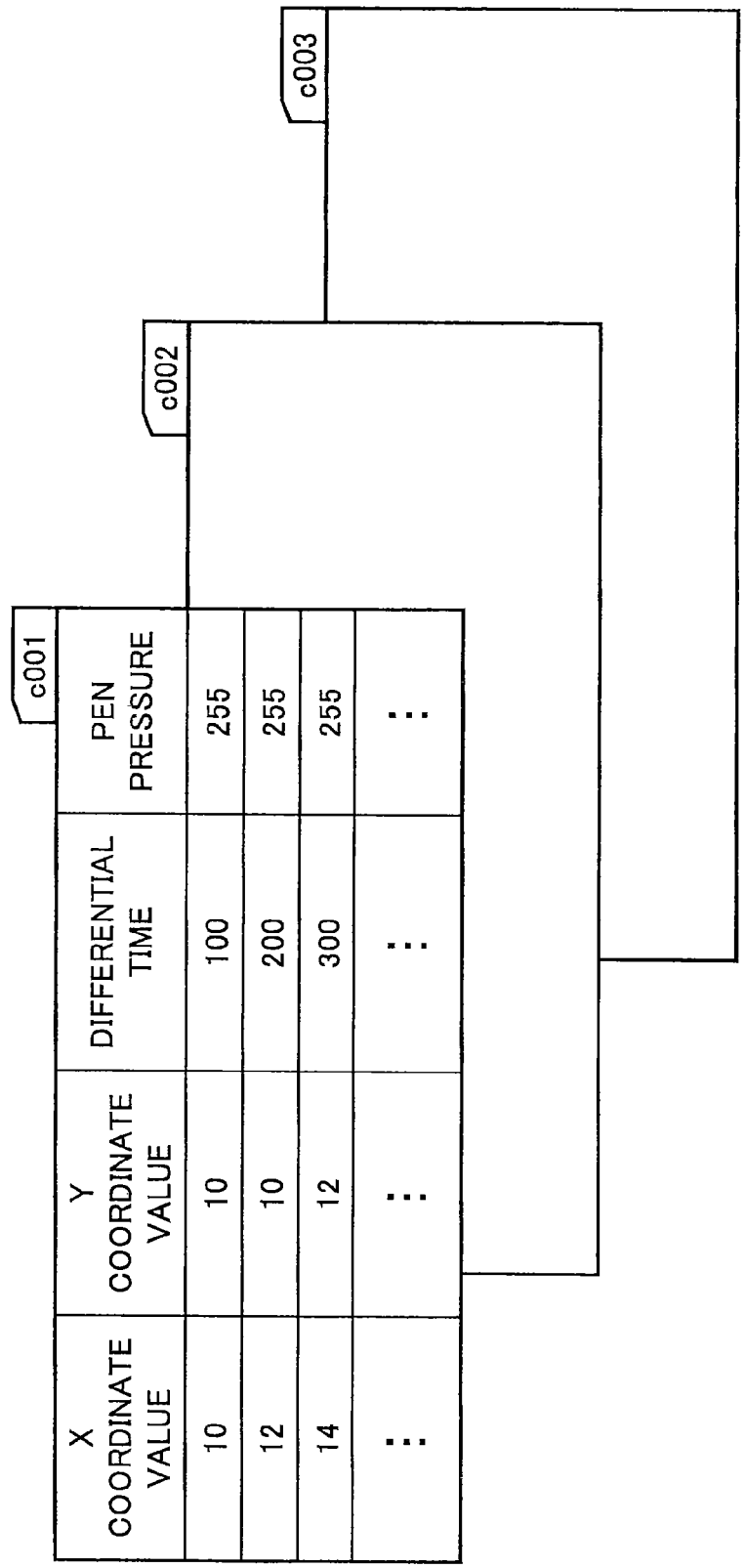
FIG. 7 is a conceptual diagram of example coordinate arrangement data.

FIG. 7 illustrates an example of coordinate layout data. A set of coordinate layout data corresponds to one stroke and includes the information related to a set of plural pass points through which the stroke passes at regular time intervals from the start time to the end time of the stroke. In this regard, the coordinate layout data include the positional coordinates (i.e., the X coordinate values and the Y coordinate values) on the display 3 of the stroke, the time when the stroke is passed on the positional coordinates (e.g., differential time relative to the start time of the stroke), and the pen pressure of the electronic pen 4.

FIG. 8 illustrates an example of medium data. The medium data refers to the data related to the images displayed on the display 3 when the page data are stored (i.e., the stroke image (B) and the background image (D)), and include the type of the data, stored (recorded) time, the data related to the layout ("layout data"), and the image data. Here, the layout data includes the display position (X, Y) on the display 3 and the size (width, height) of the image. Here, the "display position (X, Y)" refers to the display position of the left upper end of the image when the display position of the left upper end of the display 3 is set to (0, 0) as the reference.

Further, the image data of the stroke image (B) may be data in, for example, an Ink Serialized Format (ISF), and the image data of the background image (D) may be data in, for example, a JPG format. For example, when the background image (D) is not displayed on the display 3 and only the stroke image (B) is displayed on the display 3, only the data of the stroke image (B) are included in the medium data. On the other hand, when both the background image (D) and the stroke image (B) are displayed on the display 3, both the background image (D) and the stroke image (B) are included in the medium data.

The file processing section 40 (a file conversion section 43 described below) reads the page data (see FIG. 5) stored on a page basis in the page data storage section 300, and converts the image data of the stroke layout data, the stroke image (B), the background image (D) which are included in the page data, the layout data (see FIG. 8), and information related to a layer structure ("layer information") to display those images in an overlapped manner into a single electronic file in a PDF format (i.e., a "PDF file"). Here, the stroke layout data are compressed in, for example, a ZIP format, and taken into (embedded into) the page in the PDF file.

Further, the coordinate layout data are extracted from the stroke layout data. By drawing the straight lines (paths) connecting the pass points of the stroke on the page of the PDF file based on the extracted data, the stroke is reproduced. When plural page data are stored in the page data storage section 300, the plural page data may be separately converted into the respective PDF files (i.e., on a page basis) or may be collectively converted into a single PDF file. The converted PDF file is output to the temporary stored data storage section 38 and a backup processing section 46 described below.

In the PDF file, the stroke is reproduced as a set of straight lines (multiple lines) or a set of Bezier curves. In this regard, based on (the coordinate layout data (see FIG. 7) included in) the stroke layout data, more sets of the coordinate layout data may be extracted. To that end, for example, the file conversion section 43 may multiply the coordinate value of the coordinate layout data by a predetermined magnification ratio (e.g. by six), interpolate the coordinate layout data that are multiplied, extract the pass points of the stroke based on the interpolated coordinate layout data, and obtain one sixth of the extracted coordinate values to obtain much more coordinate layout data.

Figure 11:
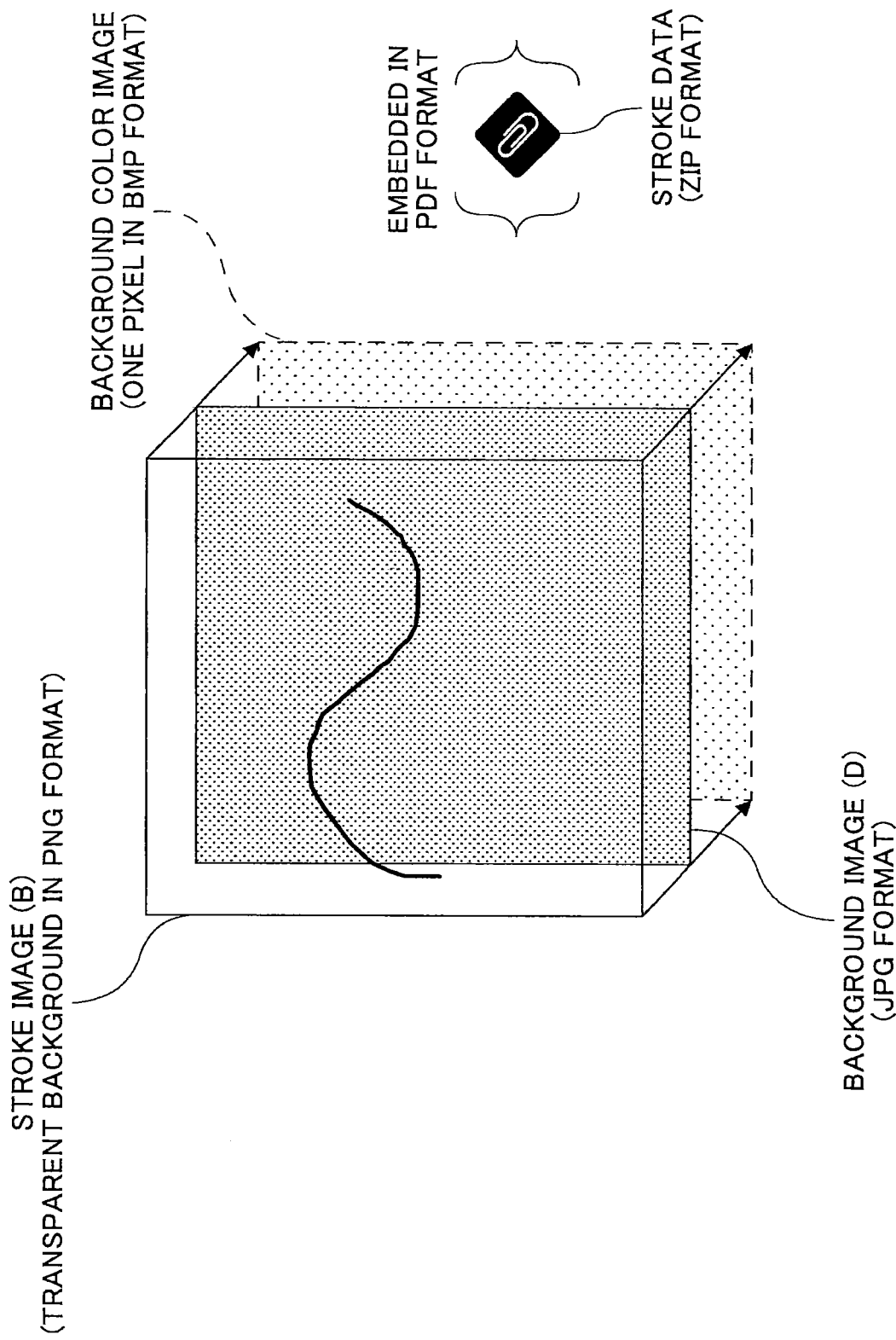
FIG. 11 is a conceptual diagram of an example layer configuration of an image reproduced from a PDF file.

The PDF file in which an image is stored can be used to reproduce the image stored therein by using a general-purpose PDF viewer (viewing software). FIG. 11 illustrates an example of a reproduced image. In accordance with the "layer information", the PDF viewer disposes the stroke image (B) in an upper layer (i.e., a layer on the front (user's) side) by using the image data of the stroke image (B), further disposes the background image (D) in a lower layer (i.e., a layer on the back side) by using the image data of the background image (D), and reproduces the stroke image (B) and the background image (D) by laying out the stroke image (B) and the background image (D) in accordance with the respective lay out data (indicating the position (X coordinate value, Y coordinate value), the width, and the height).

Figure 12A:
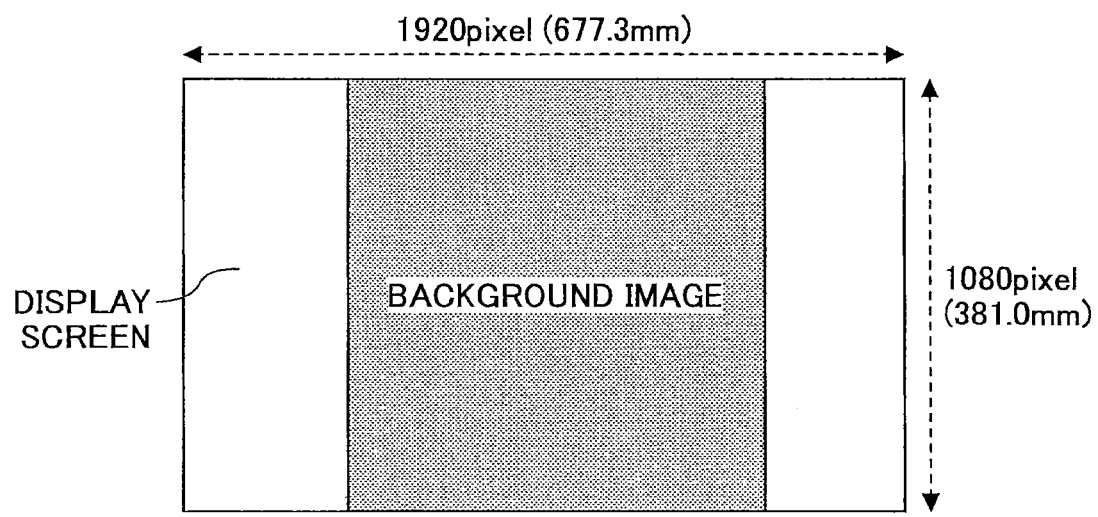
FIGS. 12A and 12B are conceptual diagrams of example layouts of a background image reproduced from a PDF file.
Figure 12B:
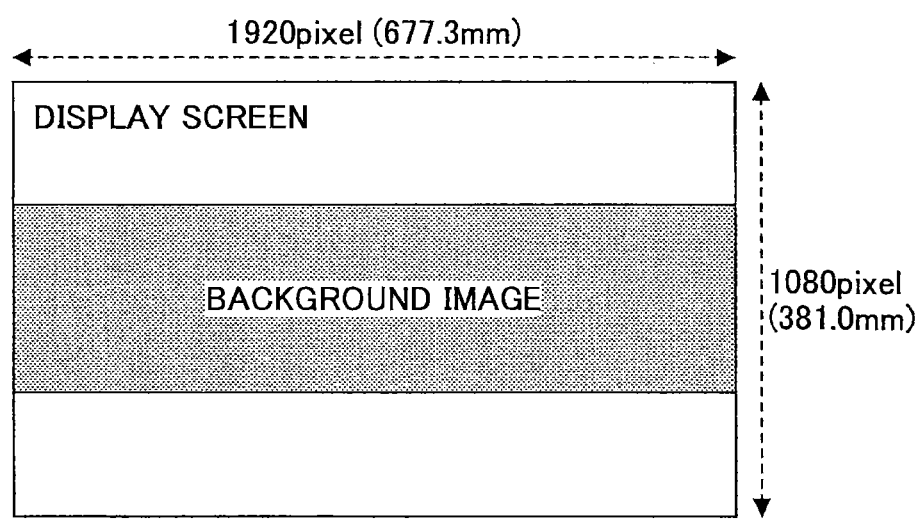

Here, as illustrated in FIGS. 12A and 12B, the background image (D) is disposed at the center of the page with respect to the display screen having the size the resolution (size) of, for example, 1920 by 1080 pixels, and is laid out by enlarging the image in a manner such that the image can fit the display screen while the aspect ratio is maintained. In the case of FIG. 12A, the background image (D) is enlarged in a manner such that the height of the background image (D)

fits the display screen. On the other hand, in the case of FIG. 12B, the background image (D) is enlarged in a manner such that the width of the background image (D) fits the display screen.

In the example of FIG. 11, one pixel of a background-color image in a BMP format is further stored in the PDF file, so that the background-color image is enlarged and reproduced in the lowermost layer (lower than the background image (D) (see FIG. 11)). Further, the stroke layout data (stroke data) is not reproduced by the PDF viewer.

The temporary stored data storage section 38 receives the PDF file from the file processing section 40 (the file conversion section 43 described below) and a file input section 42a described below, and temporarily stores the received PDF file. In this case, an identification code designated by a user with the electronic pen 4 or the like or a predetermined identification code is attached (granted) to the PDF file.

FIG. 13 illustrates an example management table of the PDF file temporarily stored in the file management section 320 ("temporarily stored file"). As illustrated in FIG. 13, the management table includes the identification code of the temporarily stored file, a storing period, stored date and time, the number of pages stored in the file, the file size, the file path, etc. Here, the "identification code" refers to a code that is attached (granted) to and associated with the "temporarily stored file". In this embodiment, the "identification code" is a four-digit number (e.g., "8930"). As the four-digit number, for example, the month and date when the file is stored, the employee number of the user or the like may be used (selected).

The identification code is also used when the temporarily stored file is downloaded. The "storing period" refers to a period to store the temporarily stored file. When the "storing period" has passed, for security purposes, the temporarily stored file is deleted by the temporary stored data storage section 38. The "file path" indicates the location where the temporarily stored file is stored in a hard disk (not shown) included in the interactive (electronic) whiteboard 2.

Figure 14:
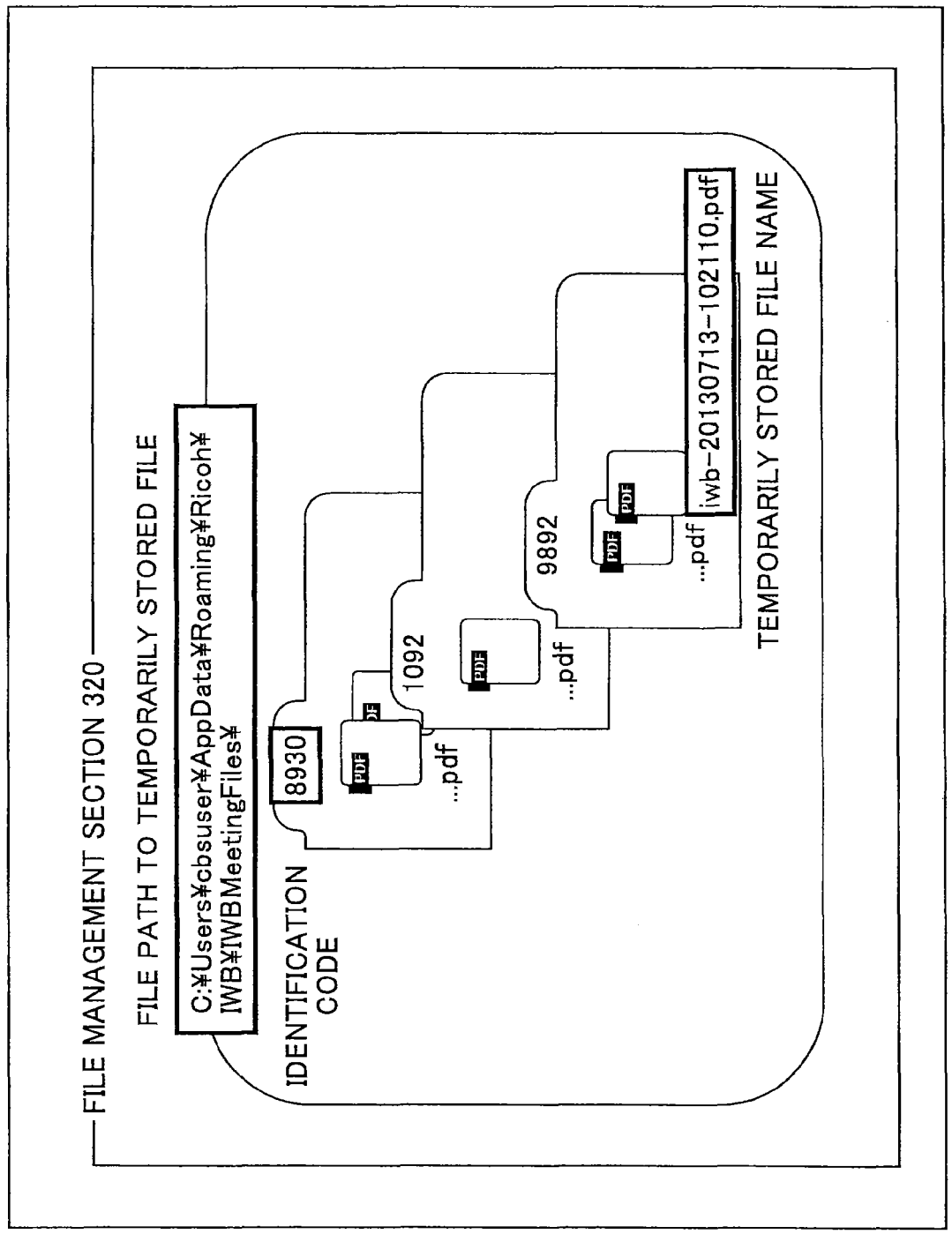
FIG. 14 is a conceptual diagram of an example storage state of the temporarily stored file.

In this embodiment, the storage location of the temporarily stored file is determined based on the identification code. Specifically, as illustrated in FIG. 14, the temporarily stored file (e.g., iwb-20130713-102110.pdf) is stored in the folder, which is provided under a predetermined path (e.g., C:¥Users¥cbsuser¥AppData¥   .   .   . ¥IWB¥IWBMeetingFiles¥), whose folder name is the same as the identification code (e.g., 8930, 1092, and 9892).

Here, the number of the temporarily stored files stored in one folder is not limited to one. Namely, two or more temporarily stored files may be stored in one folder. In this regard, for example, when the identification code is attached (granted) based on the date when the file is stored, the folders to store the files are generated for each day when the interactive (electronic) whiteboard 2 is used, so that all of the PDF files generated in the same date are stored in the same folder.

In this case, it becomes possible to search for the temporarily stored file by using the date when the interactive (electronic) whiteboard 2 is used as a key. Otherwise, for example, the employee number of the user who uses the interactive (electronic) whiteboard 2 may be used as the identification code. In this case, a folder to store the temporarily stored files is generated for each of the employees, so that it becomes possible to search for the temporarily stored file by using the employee number of the user as a key. Accordingly, by using the identification code as described above, it becomes possible to easily search for the temporarily stored file.

When the PDF file is stored in the file management section 320, UI image generation section 33 generates the UI image (e.g., an icon) indicating the PDF file. The generated UI image (icon) is displayed on the display 3 via the display superposition section 36 and the image superposition section 28. A user performs an input operation on the display by using the electronic pen 4 or the like to select the icon (i.e., the PDF file). When the PDF file is selected, the file is read (downloaded) as described below.

Figure 15:
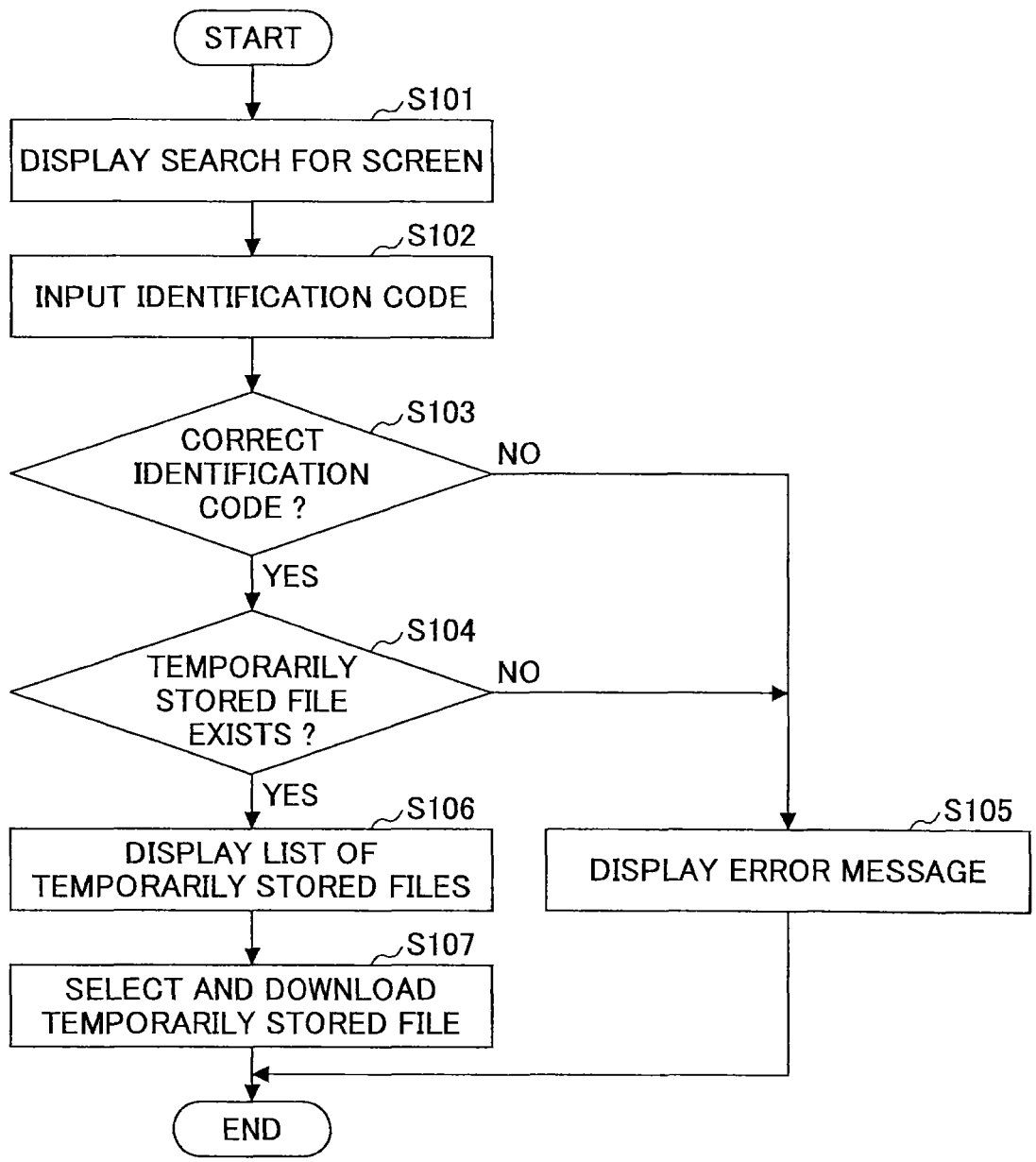
FIG. 15 is a flowchart of a procedure to search for and read the temporarily stored file.

Further, a desired PDF file may be searched for by using the identification code. FIG. 15 illustrates an example procedure to search for and read the temporarily stored file. This procedure starts when a user starts a search tool on the interactive (electronic) whiteboard 2 an inputs the URL (usually, the IP address) allocated to the interactive (electronic) whiteboard 2 with the electronic pen 4 or the like. In step S101, the interactive (electronic) whiteboard 2 (the temporary stored data storage section 38) displays a search screen on the display 3. The user inputs the identification code on the search screen with the electronic pen 4 or the like (step S102).

In step S103, the temporary stored data storage section 38 determines whether the input identification code is correct (e.g., whether the input identification code corresponds to the predetermined format such as the four-digit number). When it is determined that the input identification code is correct (YES in step S103), the process goes to step S104. Otherwise, the process goes to step S105, so that the temporary stored data storage section 38 displays an error message and the procedure ends. In step S104, the temporary stored data storage section 38 refers to the management table of the temporarily stored files (see FIG. 13) to determine whether there exists the temporarily stored file (PDF file) in association with the identification code.

When it is determined that there exists the temporarily stored file (PDF file) in association with the identification code, the process goes to step S106. On the other hand, when it is determined that there exists no temporarily stored file (PDF file) that is in association with the identification code, the process goes to step S105, so that the temporary stored data storage section 38 displays an error message and the procedure ends. In step S106, the temporary stored data storage section 38 display a list of the temporarily stored file(s) in association with the identification code among the temporarily stored files managed in the management table.

Here, if the same identification code is attached (granted) to plural temporarily stored files, the list of the temporarily stored files is displayed. Then, the user select the desired PDF file from the list with the electronic pen 4 or the like. In step S107, the temporary stored data storage section 38 terminates (closes) the search screen and reads (downloads) the selected PDF file as described below. When the reading is completed, the procedure ends.

When an icon (i.e., a PDF file) is selected by the user's input operation or when a PDF file is selected by using the search tool, the temporary stored data storage section 38 reads (downloads) the PDF file from the file management section 320, decompresses the stroke data stored on a page basis, outputs the decompressed stroke data to the stroke processing section 32, and further outputs the image data of the background image (D) to the background generation section 34.

By doing this, the stroke processing section 32 reproduces (i.e., regenerates), deletes, and edits the stroke image (B) by using the stroke data. The stroke image (B) reproduced by the stroke processing section 32 is laid out based on the layout data along with the UI image (A), the output image (C), and the background image (D) read from the PDF file by the temporary stored data storage section 38, and displayed on the display 3 via the image superposition section 28. As described above, it becomes possible to reproduce (regenerate) the stroke image on a page bases (on a page-by-page basis) to be re-edited.

When the file conversion section 43 generates a PDF file, for example, not only the stroke data or the like but also bibliographical information including the version information of the interactive (electronic) whiteboard 2 or the like may be recorded in the PDF file. In this case, the temporary stored data storage section 38 determines whether the stroke data, which is recorded from the bibliographical information when the PDF file is read, has a format that can be processed by the stroke processing section 32 (i.e., whether the stroke data are re-editable). When determining that the format of the stroke data cannot be processed, the stroke data are not take in (read) but the temporary stored data storage section 38 forms an image of each page of the PDF file and outputs the image to the background generation section 34 as the background image.

The background image (D) is laid out along with the UI image (A) and the output image (C) by the display superposition section 36, and displayed on the display 3 via the image superposition section 28. As described above, it becomes possible to display the stroke image (B) by switching the display method (manner) in accordance with the display function of the interactive (electronic) whiteboard 2 based on the version information thereof.

Further, when the temporary stored data storage section 38 fails to read the PDF file, similar to the above, the stroke data are not take in (read) but the temporary stored data storage section 38 forms an image of each page of the PDF file and outputs the image to the background generation section 34 as the background image. The background image (D) is laid out by the display superposition section 36 as the output image (C) and displayed on the display 3 via the image superposition section 28. As described above, even when the reading of the PDF file has failed, it becomes possible to display the stroke image (B) by switching the display method (manner).

The remote license management table 310 manages the license data necessary to perform (execute) the remote sharing process. FIG. 9 illustrates an example remote license management table. The remote license management table 310 includes a product ID of the interactive (electronic) whiteboard 2, a license ID to be used for authentication, and an expiration date of the license.

An example functional configuration of the file processing section 40 is described.

Figure 10:
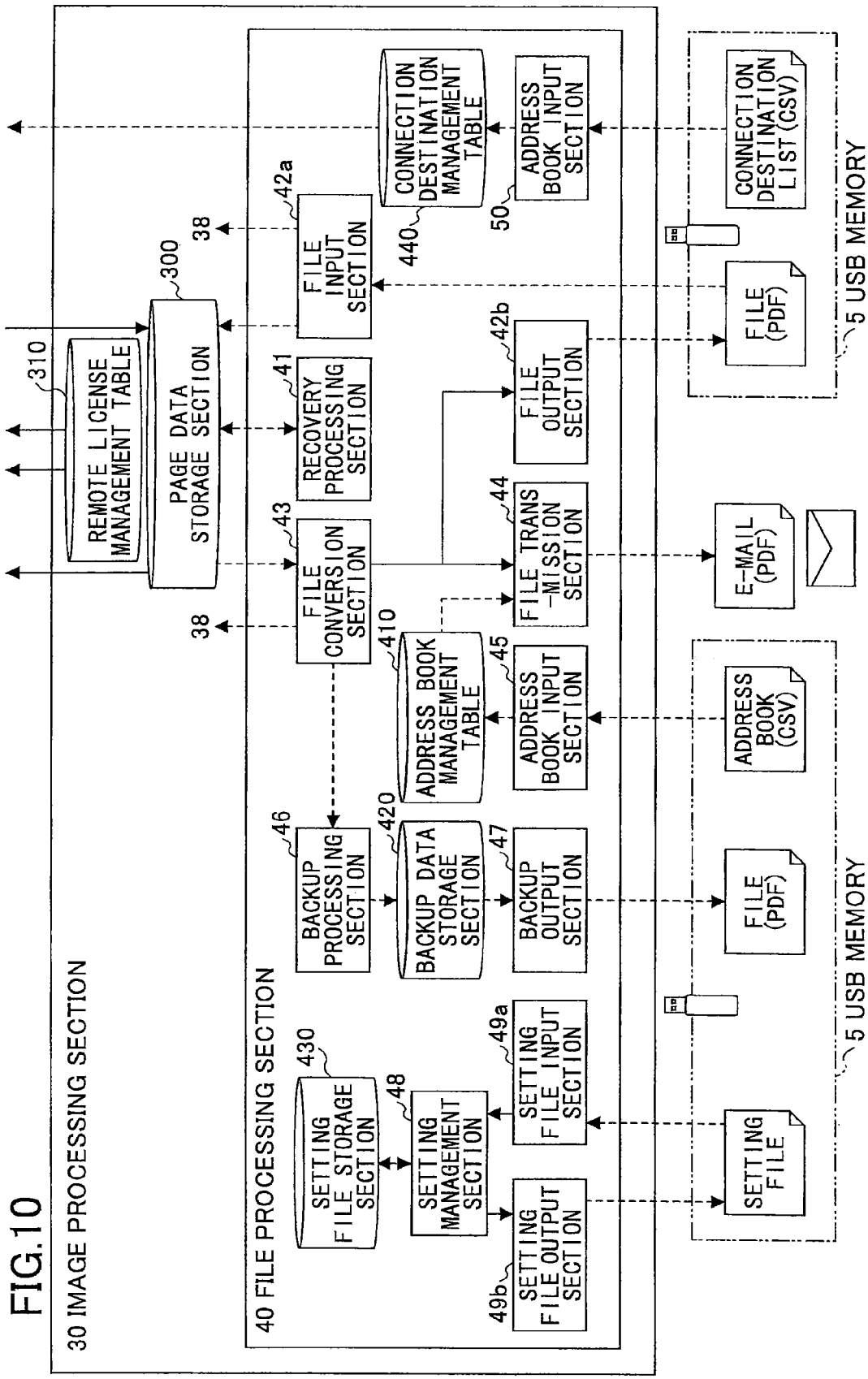
FIG. 10 is an example functional block diagram of a file processing section.

FIG. 10 illustrates an example functional configuration of the file processing section 40. As illustrated in FIG. 10, the file processing section 40 includes a recovery processing section 41, the file conversion section 43, the file input section 42a, a file output section 42b, a file transmission section 44, an address book input section 45, the backup processing section 46, a backup output section 47, a setting management section 48, a setting file output section 49b, a setting file input section 49a, and an address book input section 50. The file processing section 40 further includes an address book management table 410 to store and manage various data, a backup data storage section 420, a setting file storage section 430, and a connection destination management table 440.

When the interactive (electronic) whiteboard 2 abnormally ends an operation due to power down or the like, the recovery processing section 41 detects the abnormal end and restores the page data which are not stored. In the case of such an abnormal end of the interactive (electronic) whiteboard 2, the page data remains in the page data storage section 300 as the stored data. Therefore, the recovery processing section 41 restores the page data by reading the page data from the page data storage section 300 when the power is turned on.

As described above, the file conversion section 43 reads the page data (see FIG. 5) stored on a page basis in the page data storage section 300, and converts the read page data into a PDF file. The PDF file is output to the temporary stored data storage section 38 and the backup processing section 46.

The file input section 42a reads the PDF file from the USB memory 5, and outputs the PDF file to the temporary stored data storage section 38. Otherwise, the file input section 42a takes the stroke layout data stored on a page basis, the image data of the stroke image (B) and the background image (D), the layout data (FIG. 8) as the (converted) page data, and stores the page data into the page data storage section 300. When plural pages of PDF files are stored in the USB memory 5, all the page data corresponding to the pages are taken.

The page data stored (recorded) in the page data storage section 300 are read by the page processing section 37, so that the stroke data are decompressed and then transmitted to the stroke processing section 32. Based on the stroke data, the stroke processing section 32 reproduces (regenerates), deletes, and edits the stroke image. The stroke image (B) reproduced by the stroke processing section 32 is laid out by the display superposition section 36 along with the UI image (A), the output image (C), and the background image (D) which is read from the page data by the page processing section 37, and displayed on the display 3 via the image superposition section 28. As described above, the stroke data and the like are reproduced on a page basis.

The file output section 42b stores the PDF file, which is output from the file conversion section 43, into the USB memory 5.

The file transmission section 44 attaches the PDF file, which is output from the file conversion section 43, to e-mail to be transmitted. Here, the transmission destination of the e-mail (i.e., the e-mail address) is managed in the address book management table 410. FIG. 16 illustrates an example address book management table 410. As illustrated in FIG. 16, the address book management table 410 indicates a list including the names of the destinations in association with the e-mail addresses. The content of the address book management table 410 is displayed on the display 3 by the display superposition section 36, so that a user can perform an input operation on the display using the touch panel or the like to select the e-mail address as the transmission destination. Otherwise, for example, the user may perform an input operation on the display using the touch panel or the like to input the e-mail address as the transmission destination. The file transmission section 44 determines the selected or the input e-mail address as the transmission destination.

The address book input section 45 reads the address book (e.g., an electric file in a CSV format), which is a list of the e-mail addresses, from the USB memory 5, and stores (records) the content of the address book into the address book management table 410.

The backup processing section 46 performs a backup process by receiving the PDF file from the file conversion section 43 and storing the received PDF file into the backup data storage section 420. FIG. 17 illustrates example backup data. The backup data are stored as a file having a PDF format (i.e., a PDF file). This backup process is performed only when a user sets the backup. Namely, when the backup process is not set by a user, the backup process is not performed.

The backup output section 47 stores the PDF file, which is stored in the backup data storage section 420, into the USB memory 5. Here, when the PDF file is to be stored, for security purposes, the user is prompted to input the password via the touch panel or the like. Further, the PDF file stored in the USB memory 5 can be read by the file input section 42a described above.

The setting management section 48 manages various setting information items of the interactive (electronic) whiteboard 2 by storing and reading the setting information items into and from the setting file storage section 430. The setting information items of the interactive (electronic) whiteboard 2 refer to the information items such as, for example, a network setting, a date and time setting, an area and language setting, a mail-server setting, an address book setting, a connection list setting, a backup setting, etc. Here, the network setting refers to, for example, an IP address setting of the interactive (electronic) whiteboard 2, a netmask setting, a default gateway setting, a Domain Name System (DNS) setting, etc.

The setting file output section 49b stores the various setting information items of the interactive (electronic) whiteboard 2 into the USB memory 5 as a setting file. For security purposes, the content of the setting file cannot be perceived by a user.

The setting file input section 49a read the setting file from the USB memory 5, and outputs the setting file to the setting management section 48. By doing this, the various setting information items can be reflected on the corresponding settings of the interactive (electronic) whiteboard 2.

The address book input section 50 reads a connection destination list (e.g., an electronic file in a CVS format), which is a list of connection destination IP addresses for the remote sharing process, from the USB memory 5, and stores the connection destination list into the connection destination management table 440. Here, the connection destination management table 440 refers to a table storing the IP address of one interactive (electronic) whiteboard 2 in advance, so that, when the interactive (electronic) whiteboard 2 is the participation device (i.e., when the interactive (electronic) whiteboard 2 participates afterwards in the remote sharing process that is already started), a user can skip the input of the IP address of the interactive (electronic) whiteboard 2 of the host device (which is the interactive (electronic) whiteboard 2 that starts the remote sharing process) into the interactive (electronic) whiteboard 2 of the participation device.

FIG. 18 illustrates an example connection destination management table 440. The connection destination management table 440 includes, for example, the names (in this example, the locations where the corresponding interactive (electronic) whiteboards 2 are installed are described) of the interactive (electronic) whiteboards 2 that can serve as the host device in association with the corresponding IP addresses.

In place of using the connection destination management table 440, a user of the participation device may input the IP address of the host device with an input device such as the touch panel whenever necessary. In this case, it may be necessary for a user of the participation device to get to know the IP address by, for example, a call or e-mail from the user of the host device in advance.

Next, an example functional configuration of the communication control section 60 is described.

Figure 20:
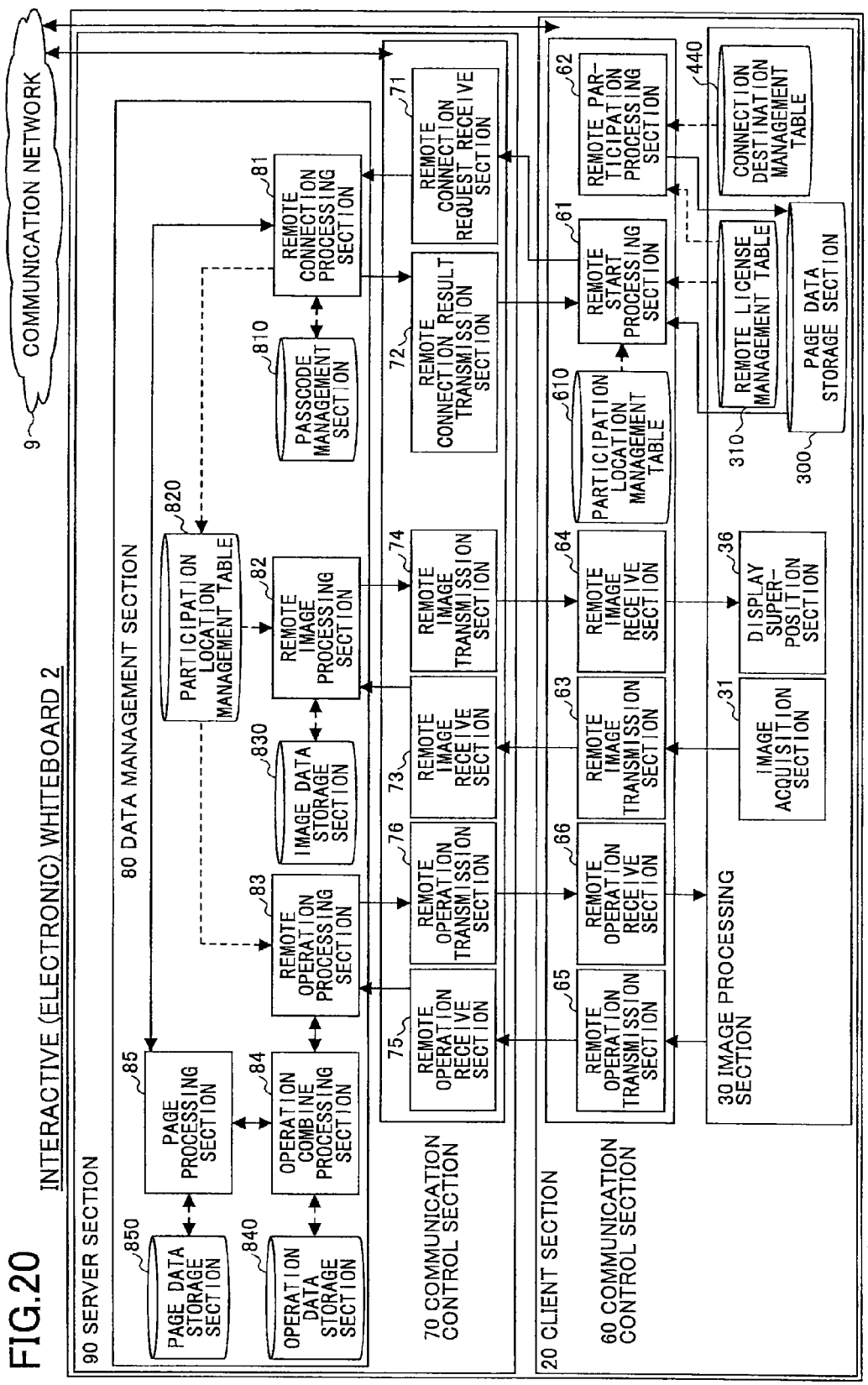
FIG. 20 is an example functional block diagram of a server section and a client section.

FIG. 20 illustrates an example functional configuration of the communication control section 60. The communication control section 60 controls the communications with other interactive (electronic) whiteboards 2 via the communication network 9. As illustrated in FIG. 20, the communication control section 60 includes a remote start processing section 61, a remote participation processing section 62, a remote image transmission section 63, a remote image receive section 64, a remote operation transmission section 65, a remote operation receive section 66, and a participation location management table 610.

The remote start processing section 61 sends a request to the server section 90 described below for newly starting the remote sharing process, and receives the result of the request from the server section 90. Before sending the request, the remote start processing section 61 refers to the remote license management table 310 and determines whether the license information (i.e., the product ID of the interactive (electronic) whiteboard 2, the license ID to be used for authentication, and the expire date of the license) is managed. Only when determining that the license information is managed, the remote start processing section 61 sends the request for newly starting the remote sharing process. On the other hand, when determining that the license information is not managed, the remote start processing section 61 does not send the request.

The remote participation processing section 62 sends a request for the participation in the remote sharing process to the server section 90 (a remote connection request receive section 71) of the host device (i.e., the interactive (electronic) whiteboard that starts the remote sharing process). Before sending the request, the remote participation processing section 62 refers to the remote license management table 310. Further, the remote participation processing section 62 refers to the connection destination management table 440 and acquires the IP address of the host device. Here, in place of referring to the connection destination management table 440 by the remote participation processing section 62, a user may operate an input device such as a touch panel to input the IP address of the host device whenever necessary.

The remote image transmission section 63 transmits the output image (C), which is transmitted from the image acquisition section 21 (see FIG. 3) via the image acquisition section 31, to the server section 90 (a remote image receive section 73).

The remote image receive section 64 receives an output image (an image signal), which is from an image output device connected to another interactive (electronic) whiteboard 2, from the server section 90 (a remote image transmission section 74), and outputs the output image (the image signal) to the display superposition section 36. By doing this, the remote sharing process can be performed.

The remote operation transmission section 65 transmits various operation data, which are necessary for the remote sharing process, to the server section (a remote operation receive section 75). The "operation data" refers to the data related to, for example, addition of a stroke, deletion of a stroke, editing (enlargement, reduction, and movement) of a stroke, storage of page data, generation of page data, deletion of page data, switching of display data, etc.

The remote operation receive section 66 receives the operation data, which are input through the other interactive (electronic) whiteboard 2, from the server section 90 (a remote operation transmission section 76), and outputs the operation data to the image processing section 30. By doing this, the remote sharing process can be performed.

Here, the participation location management table 610 refers to a table to be used, when the interactive (electronic) whiteboard 2 is the host device, to manage the other interactive (electronic) whiteboard(s) 2 that currently participates in the remote sharing process as the participation device(s). FIG. 19 illustrates an example participation location management table 610. As illustrated in FIG. 19, the participation location management table 610 includes, for example, the names (in this example, the locations where the interactive (electronic) whiteboards 2 are installed are described) of the interactive (electronic) whiteboards 2 that serve as the participation devices in association with the IP addresses of the interactive (electronic) whiteboards 2.

An example functional configuration of the server section 90 is described. In this embodiment, it is assumed that all the interactive (electronic) whiteboards 2 include the respective server sections 90, so that all the interactive (electronic) whiteboards 2 can perform the functions of the server section 90. FIG. 20 illustrates an example functional configuration of the server section 90 (along with the example functional configuration of the communication control section 60). As illustrated in FIG. 20, the server section 90 roughly includes a communication control section 70 and a data management section 80.

An example functional configuration of the communication control section 70 is described. The communication control section 70 controls the communications with the communication control section 60 in the client section 20 in the same interactive (electronic) whiteboard 2 and the communications with the communication control section 60 in the client section 20 of the other interactive (electronic) whiteboard 2 via the communication network 9. Further, the communication control section 70 includes the remote connection request receive section 71, a remote connection result transmission section 72, the remote image receive section 73, the remote image transmission section 74, the remote operation receive section 75, and the remote operation transmission section 76.

The remote connection request receive section 71 receives the request for starting the remote sharing process from the remote start processing section 61, and further receives the request for starting the remote sharing process from the remote participation processing section 62 of another interactive (electronic) whiteboard 2 via the communication network 9. The remote connection result transmission section 72 transmits a result, which is in response to the request for starting the remote sharing process, to the remote start processing section 61, and further transmits the result, which is in response to the request for starting the remote sharing process, to the remote participation processing section 62 of the other interactive (electronic) whiteboard 2 via the communication network 9.

The remote image receive section 73 receives the image data (i.e., the output image (C)) from the remote image transmission section 63, and transmits the image data to a remote image processing section 82 described below. The remote image transmission section 74 receives the image data from the remote image processing section 82, and transmits the image data to the remote image receive section 64.

The remote operation receive section 75 receives the operation data (i.e., the data such as the stroke image (D)) from the remote operation transmission section 65, and transmits the operation data to a remote operation processing section 83 described below. The remote operation transmission section 76 receives the operation data from the remote operation processing section 83, and transmits the operation data to the remote operation receive section 66.

An example functional operation of the data management section 80 is described. The data management section 80 manages the operation data and the image data. As illustrated in FIG. 20, the data management section 80 includes a remote connection processing section 81, the remote image processing section 82, the remote operation processing section 83, an operation combine processing section 84, and a page processing section 85. The server section 90 further includes a passcode management section 810, a participation location management table 820, an image data storage section 830, the operation data storage section 840, and a page data storage section 850.

The remote connection processing section 81 starts and ends the remote sharing process. When starting the remote sharing process, the remote connection processing section 81 determines whether to permit the participation of the other interactive (electronic) whiteboard(s) 2 in the remote sharing process. Here, the remote connection processing section 81 receives the license information, which is received from the remote start processing section 61 by the connection request receive section 71 along with the request for staring the remote sharing process, or the license information, which is received from the remote participation processing section 62 along with the request for staring the remote sharing process, and determines whether the license information includes the license and whether the license is valid when the license is included.

Further, the remote connection processing section 81 determines whether the number of the other interactive (electronic) whiteboards 2 requesting participation in the remote sharing process exceeds a predetermined number (the maximum number of the interactive (electronic) whiteboards 2 that can participate in the remote sharing process). When determining that there is an interactive (electronic) whiteboard 2 that does not have a valid license or when determining that the number of the other interactive (electronic) whiteboards 2 requesting participation in the remote sharing process exceeds the predetermined number if another interactive (electronic) whiteboard 2 is permitted to participate in the remote sharing process, the remote connection processing section 81 refuses the participation of the (other) interactive (electronic) whiteboard 2.

Further, the remote connection processing section 81 determines (authenticates) whether the passcode, which is transmitted from the other interactive (electronic) whiteboard 2 along with the request for the participation in the remote sharing process, corresponds to a passcode managed by the passcode management section 810, so that when determining that the passcode corresponds to a passcode managed by the passcode management section 810, the remote connection processing section 81 permits the participation of the interactive (electronic) whiteboard 2 in the remote sharing process, but otherwise, the remote connection processing section 81 refuses the participation.

The passcode is issued by the remote connection processing section 81 when the remote sharing process is newly started and is managed by the passcode management section 810. A user of the participation device that is to participate in the remote sharing process acquires the passcode by, for example, calling, sending e-mail or the like. The user of the participation device can send the request for the participation in the remote sharing process by inputting the acquired passcode in the participation device. For example, higher priority may be placed on the usability rather than security. Namely, only the license may be checked and the checking of the passcode may be omitted.

When the remote sharing process is started, the remote connection processing section 81 stores participation location information, which is included in the request for the participation from the remote participation processing section 62 of the participation device via the communication network 9, into the participation location management table 820. Further, the remote connection processing section 81 reads remote location information stored in the participation location management table 820, and transmits the remote location information to the connection result transmission section 72.

The remote location information is further transmitted to the remote start processing section 61, and stored into the participation location management table 610. By doing this, in the host device, participation location management information having the same content can be managed in both the client section 20 and the server section 90.

The remote image processing section 82 receives the image data (i.e., the output image (C)) from the image output device (e.g., the laptop PC 6) connected to the client section 20 of the interactive (electronic) whiteboard 2 (including both the host device and the participation device) that is participating in the remote sharing process, and stores the received image data into the image data storage section 830. Further, the remote image processing section 82 determines the display order of the image data, on which the remote sharing process is to be performed, based on the order of the received time of the image data.

Further, the remote image processing section 82 refers to the participation location management table 820, and transmits the image data in accordance with the determined display order to the client sections 20 of all the interactive (electronic) whiteboards 2 who are participating in the remote sharing process (including both the host device and the participation device(s)) via the communication control section 70 (the remote image transmission section 74).

The remote operation processing section 83 receives various operation data (e.g., stroke image (B)) such as stroke image (stroke image (B)) which is drawn in the client section 20 of the interactive (electronic) whiteboard 2 that is participating in the remote sharing process (including both the host device and the participation device), and determines the display order of the images based on the order of the received time of the images. Here, the various operation data refers to the various operation data described above.

Further, the remote operation processing section 83 refers to the participation location management table 820, and transmits the operation data to the client sections 20 of the interactive (electronic) whiteboards 2 that are participating in the remote sharing process (including both the host device and the participation device(s)).

The operation combine processing section 84 combines the operation data of the interactive (electronic) whiteboards 2 output from the remote operation processing section 83, stores the combined operation data into the operation data storage section 840, and sends the combined operation data back to the remote operation processing section 83. The operation data, which are sent back to the operation processing section 83, are transmitted to the client sections 20 of the interactive (electronic) whiteboards 2 including both the host device and the participation device via the remote operation transmission section 76. By doing this, the same image related to the operation data can be displayed on those interactive (electronic) whiteboards 2.

FIG. 21 illustrates example operation data. As illustrated in FIG. 21, the operation data include Sequence (SEQ), operation name, the IP address of the interactive (electronic) whiteboard 2 and the Port No., of the client section (server section) of the transmission source, the IP address of the interactive (electronic) whiteboard 2 and the Port No., of the client section (server section) of the transmission target, operation type, operation target, and data related to the content of the operation, which are associated with each other.

For example, the operation data "SEQ1" indicates that a stroke is drawn in the client section 20 (Port No.: 50001) of the interactive (electronic) whiteboard 2 serving as the host device (IP address: 192.0.0.1), so that the stroke data whose type is "STROKE" and whose target is "page data ID: p005" are transmitted to the server section 90 (Port No.: 50000) of the interactive (electronic) whiteboard 2 serving as the same host device (IP address: 192.0.0.1).

Similarly, the operation data "SEQ2" indicates that stroke data are transmitted from the server section 90 (Port No.: 50000) of the interactive (electronic) whiteboard 2 serving as the host device (IP address: 192.0.0.1) to the client section 20 (Port No.: 50001) of the interactive (electronic) whiteboard 2 serving as the participation device (IP address: 192.0.0.2).

Here, the operation combine processing section 84 combines the operation data in the input order of the operation data. In this regard, unless the communication network 9 is congested, the stroke image (B) which are input (drawn) by the users of the interactive (electronic) whiteboards 2 participating in the remote sharing process may be displayed on the displays 3 of all the interactive (electronic) whiteboards 2 in the input (drawing) order of the users.

The page processing section 85 has the functions similar to the functions of the page processing section 37 in the image processing section 30 of the client section 20, and stores the page data as illustrated in FIGS. 5 through 7 into the page data storage section 850. The content of the page data storage section 850 is similar to that of the page data storage section 300. Therefore, the description of the page data storage section 850 is omitted.

Next, the operations of a remote sharing process by the interactive (electronic) whiteboards 2 included in the image processing system 1 according to an embodiment in the remote are described.

Here, for explanatory purposes, a case is described where the image processing system 1 includes interactive (electronic) whiteboards 2*a*, 2*b*, and 2*c* so that the interactive (electronic) whiteboard 2*a* serves as the host device hosting the remote sharing process and the interactive (electronic) whiteboards 2*b* and 2*c* serve as the participation devices that participate in the remote sharing process started by the interactive (electronic) whiteboard 2*a* serving as the host device.

Here, special attention is paid to the operations of the server section 90 and the client section 20 of the interactive (electronic) whiteboard 2*a* and the client section 20 of the interactive (electronic) whiteboards 2*b* and 2*c*. Further, it is assumed that the interactive (electronic) whiteboards 2*a*, 2*b*, and 2*c* are equipped with the displays 3*a*, 3*b*, and 3*c* and are connected to the laptop PCs 6*a*, 6*b*, and 6*c*, and the electronic pens 4*a*, 4*b*, and 4*c* are used for the interactive (electronic) whiteboards 2*a*, 2*b*, and 2*c*, respectively.

First, the start of the remote sharing process and a participation process are described. FIG. 22 illustrates is a flowchart of an example of the start of the remote sharing process and the participation process.

Here, it is also assumed that the interactive (electronic) whiteboards 2a, 2b, and 2c are turned on by the respective users, so that the client sections 20 thereof are started.

In step S21, the user of the host device 2a (i.e., the interactive (electronic) whiteboard 2a) creates an instruction to start the remote sharing process by using an input device such as a touch panel, so that the remote start processing section 61 of the client section 20 outputs a signal, which includes the instruction to start the server section 90, to the remote connection request receive section 71 of the server section 90.

By doing this, in the host device 2a, not only the client sections 20 but also the server section 90 is started. The host device 2a (server section 90) starts the remote sharing process (i.e., a preprocess to accept the participation process so that participation devices 2b and 2c (interactive (electronic) whiteboards 2b and 2c) can participate in the remote sharing process).

In step S22, the UI image generation section 33 in the client section 20 of the host device 2a generates the UI image displaying the connection information for establishing the connection with the host device 2a, and outputs the UI image to the image superposition section 28 via the display superposition section 36. The image superposition section 28 displays the UI image on the display 3a. Here, the connection information includes the IP address of the host device 2a and the passcode which is issued by the remote connection processing section 81 relative to the remote sharing process of this time.

The passcode is read from the passcode management section 810 by the remote connection processing section 81 and is transmitted to the UI image generation section 33 (image processing section 30) via sequentially the connection result transmission section 72 and the remote start processing section 61 (communication control section 60) (see FIGS. 20 and 3).

The use of the host device 2a reviews (sees) the connection information displayed on the display 3a, and sends the content of the connection information to the users of the participation devices 2b and 2c using a telephone, e-mail or the like. When the IP address of the host device 2a is managed in the connection destination list stored in the connection destination management table 440, the connection information may include only the passcode. The users of the participation devices 2b and 2c input the transmitted connection information into the respective participation devices 2b and 2c with input devices such as touch panels.

When the participation devices 2b and 2c receive the respective connection information, in steps S23 and S24, the respective remote participation processing sections 62 in the client sections 20 transmit the passcodes to the communication control section 70 in the server section 90 of the host device 2a via the communication network 9 by using the IP address included in the connection information.

By doing this, the request for the participation in the remote sharing process started by the host device 2a is transmitted. Accordingly, the connection request receive section 71 of the communication control section 70 receives the requests for the participation (including the passcode) from the participation devices 2b and 2c, and outputs the passcode to the remote connection processing section 81.

In step S25, when the host device 2a receives the passcode, the remote connection processing section 81 in the server section 90 of the host device 2a authenticates the received passcode using the passcode(s) managed by the passcode management section 810. In step S26, the remote connection result transmission section 72 reports the authentication results to the respective client sections 20 of the participation devices 2b and 2c. By doing this, the communications in the remote sharing process between the host device 2a and the participation devices 2b and 2c are established, so that the start of the remote sharing process and the participation process are completed.

Figure 23:
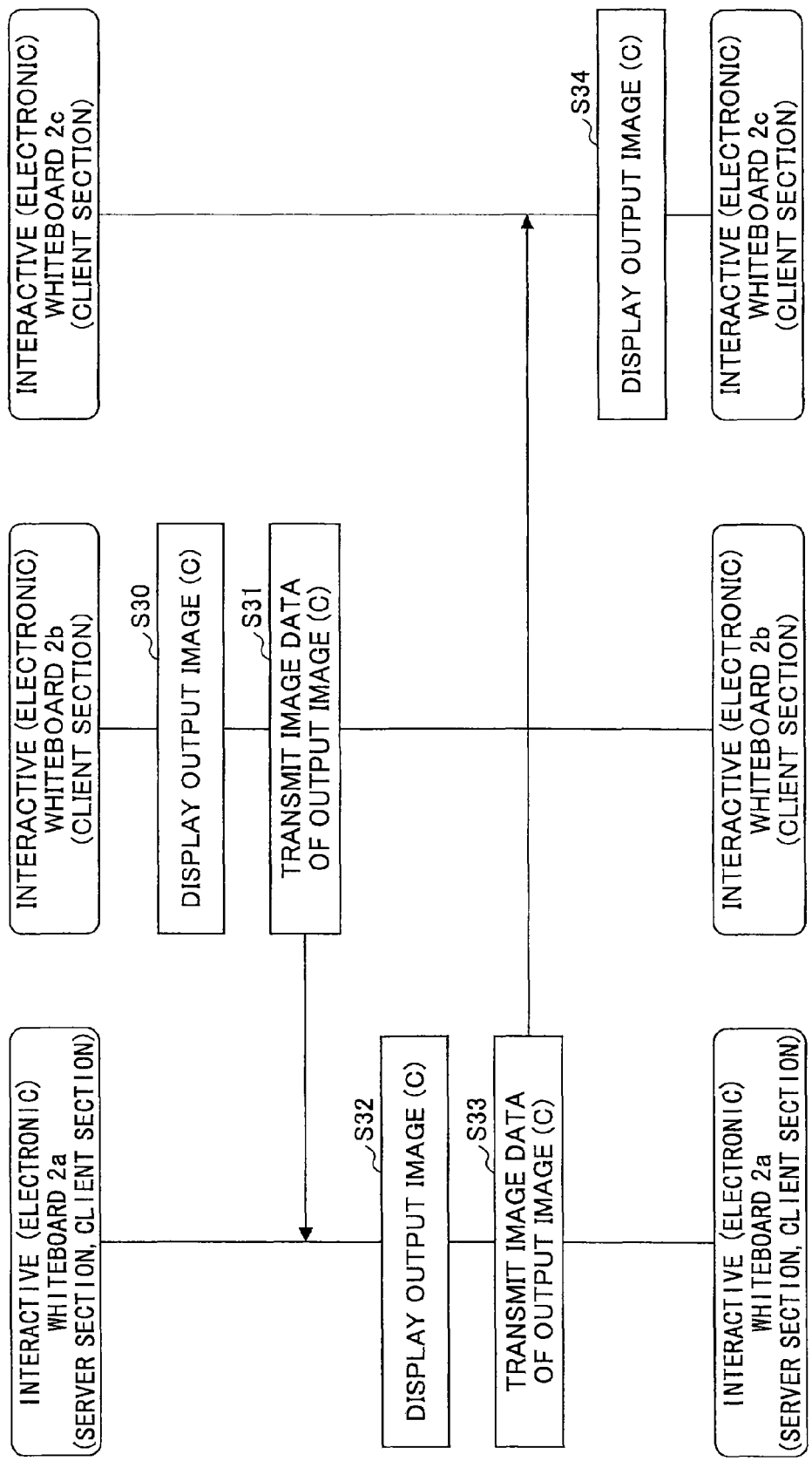
FIG. 23 is a sequence diagram of an example flow of a sharing process of image data in the remote sharing process.

Next, a sharing process of sharing image data in the remote sharing process is described. FIG. 23 is a sequence diagram illustrating an example flow of the sharing process of sharing an image data.

In step S30, the image acquisition section 31 in the client section 20 of the participation device 2b generates image data (output image (C)) using an output image from the laptop PC 6b. The generated image data (output image (C)) is output to the image superposition section 28 via the display superposition section 36 and displayed on the display 3b of the participation device 2b (see FIG. 3).

In step S31, the remote image transmission section 63 (the communication control section 60) in the client section 20 of the participation device 2b receives the image data (output image (C)) from the image acquisition section 31 (image processing section 30), and transmits the image data (output image (C)) to the remote image receive section 73 (communication control section 70) in the server section 90 of the host device 2a via the communication network 9. The image data (output image (C)) are further transmitted to the remote image processing section 82 via the remote image receive section 73 and stored into the image data storage section 830 (see FIG. 20).

In step S32, the image superposition section 28 in the client section 20 of the host device 2a displays the image data (output image (C)), which is received from the participation device 2b, on the display 3a. However, the output image (C), which is received by the remote image receive section 73 in the server section 90 in step S31, is transmitted to the image superposition section 28 in the client section 20 via sequentially the remote image processing section 82 and the remote image transmission section 74 in the server section 90 and the remote image receive section 64 and the display superposition section 36 of the client section 20.

In step S33, the remote image transmission section 74 (the communication control section 70) in the server section 90 of the host device 2a transmits the image data (output image (C)) to the remote image receive section 64 in the client section 20 of the same host device 2a (in step S32), and further transmits the image data (output image (C)) to the communication control section 60 (remote image receive section 64) in the client section 20 of the participation device 2c, which is the participation device other than the participation device 2b that transmits the image data (output image (C)), via the communication network 9.

In this case, in the participation device 2c, the output image (C), which is received by the remote image receive section 64 in the client section 20, is transmitted to the image superposition section 28 via the display superposition section 36.

In step S34, the image superposition section 28 in the client section 20 of the participation device 2c displays the image data (output image (C)), which is transmitted from the participation device 2b via the host device 2a (the server section 90), on the display 3c. However, the output image (C), which is received by the remote image receive section 64 in the client section 20 in step S33, is transmitted to the image superposition section 28 via the display superposition section 36. By doing this, the sharing process of sharing the image data in the remote sharing process is completed.

Further, when not only the image data of the output image (C) but also the image data of the UI image (A) and the image data of the stroke image (B) are input to the display superposition section 36, the display superposition section 36 generates a superimposed image (A, B, and C), and outputs the superimposed image (A, B, and C) to the image superposition section 28. The image superposition section 28 displays the superimposed image (A, B, and C) on the display 3c.

Further, when the image data of a video conference image (E) are transmitted from the video conference terminal 7 to the image superposition section 28, the image superposition section 28 displays the video conference image (E) to be superimposed on the superimposed image (A, B, and C) in the picture in picture display on the display 3c.

Figure 24:
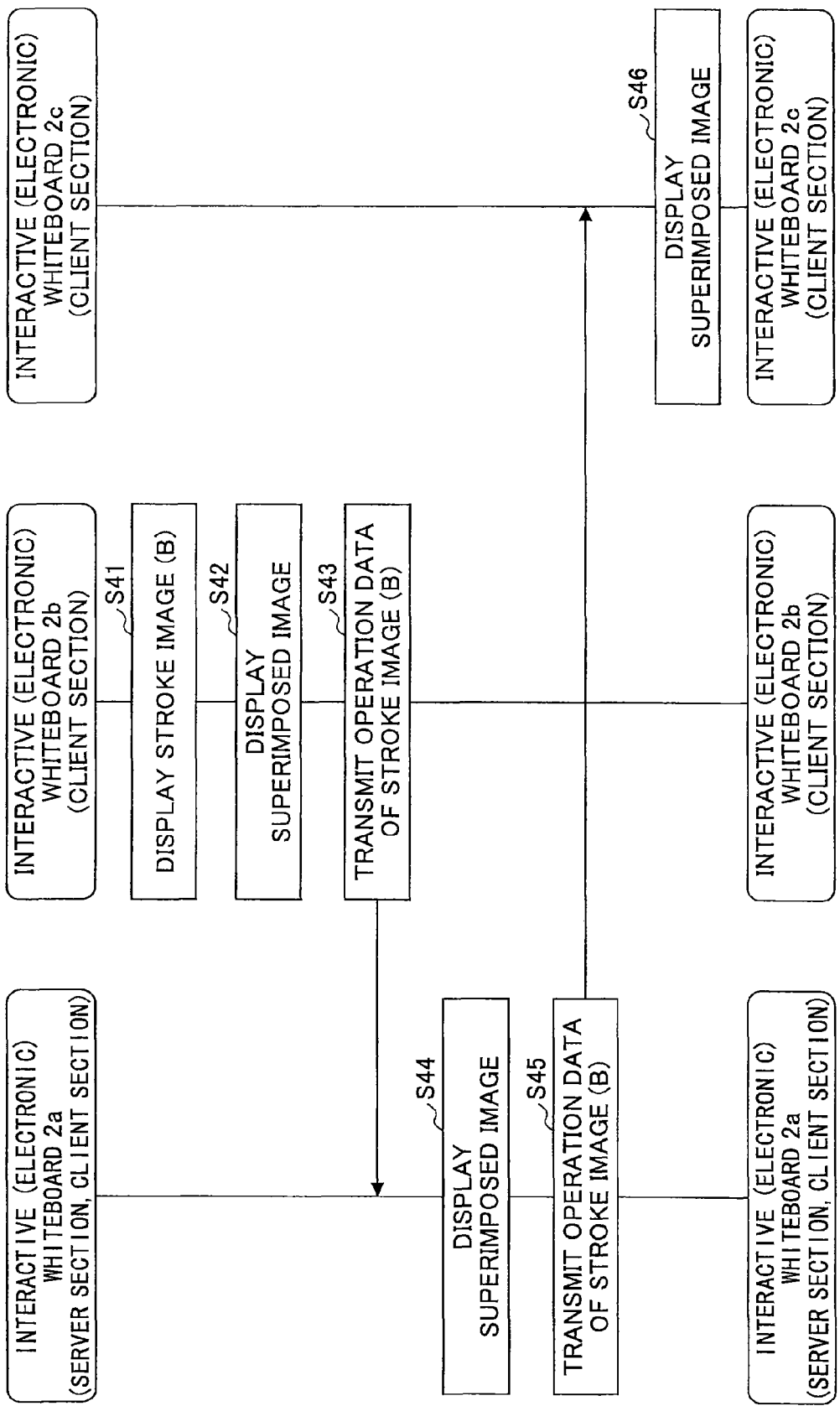
FIG. 24 is a sequence diagram of an example flow of a sharing process of operation data in the remote sharing process.

Next, a sharing process of sharing the operation data in the remote sharing process is described. FIG. 24 is a sequence diagram illustrating the flow of the sharing process of sharing the operation data.

In step S41, the participation device 2b draws the stroke image (B), which is drawn by a user on the interactive (electronic) whiteboard 2b with the electronic pen 4b, and displays the stroke image (B) on the display 3b.

In step S42, the display superposition section 36 in the client section 20 of the participation device 2b superimposes the stroke image (B) on the UI image (A), the output image (C), and the background image (D), as illustrated in FIG. 4, so that the image superposition section 28 displays the superimposed image (A, B, C, and D) on the display 3b of the interactive (electronic) whiteboard (participation device) 2b. However, the stroke processing section 32 receives the operation data of the stroke image (B) from the coordinate detection section 22 and the touching detection section 24 via the event classification section 25, and transmits the operation data of the stroke image (B) to the display superposition section 36 (see FIG. 3).

In step S43, the remote operation transmission section 65 in the client section 20 of the participation device 2b receives the data (operation data) of the stroke image (B) from the stroke processing section 32 (the image processing section 30), and transmits the data (operation data) of the stroke image (B) to the communication control section 70 (the remote operation receive section 75) via the communication network 9 (see FIG. 20).

In the host device 2a, the data (operation data) of the stroke image (B) received from the remote operation receive section 75 in the server section 90 are transmitted to the operation combine processing section 84 via the remote operation processing section 83.

Here, the data of the stroke image (B) refers the data which are indicated for each stroke data ID (see FIG. 6). For example, as described above, when a user draws a letter "T" with the electronic pen 4, the data of the stroke image (B) indicating the two stroke data IDs are sequentially transmitted.

In step S44, the host device 2a displays the superimposed image (A, B, and C), which includes the data of the stroke image (B) transmitted from the participation device 2b, on the display 3a. Here, the operation combine processing section 84 of the host device 2a combines plural data of the stroke images (B) sequentially transmitted via the remote operation processing section 83, stores the combined data into the operation data storage section 840, and sends the combined data back to the remote operation processing section 83. The combined data of the stroke image (B) are transmitted to the display superposition section 36 via the remote operation transmission section 76 in the server section 90 and the remote operation receive section 66 in the client section 20 of the host device 2a.

The display superposition section 36 superimposes the combined stroke image (B) on the UI image (A), the output image (C), and the background image (D), and outputs the superimposed image (A, B, C, and D) to the image superposition section 28. The image superposition section 28 displays the superimposed image (A, B, C, and D) on the display 3a of the host device 2a.

In step S45, the remote operation transmission section 76 (the communication control section 70) in the server section 90 of the host device 2a receives the combined data of the stroke image (B) from the remote operation processing section 83 (in step S44), transmits the combined data of the stroke image (B) to the remote operation receive section 66 in the client section 20 in the same host device 2a, and further transmits the combined data of the stroke image (B) to the communication control section 60 (the remote operation receive section 66) in the client section 20 of the participation device 2c, which is the participation device other than the participation device 2b that transmits the data of the stroke image (B), via the communication network 9.

In step s46, the participation device 2c displays the superimposed image (A, B, and C) on the display 3c. Here, the remote operation receive section 66 of the interactive (electronic) whiteboard (participation device) 2c outputs the combined data of the stroke image (B), which are received in step S45, to the image processing section 30 (the display superposition section 36).

Similar to step S44, the display superposition section 36 superimposes the combined stroke image (B) on the UI image (A), the output image (C), and the background image (D), and outputs the superimposed image (A, B, C, and D) to the image superposition section 28. The image superposition section 28 displays the superimposed image (A, B, C, and D) on the display 3c of the participation device 2c. By doing this, the sharing process of sharing the operation data in the remote sharing process is completed.

In the above description, a case is described where both the output image (C) and the background image (D) are displayed on the display 3c. However, alternatively, only one of the output image (C) and the background image (D) may be superimposed with the UI image (A) and the combined stroke image (B) to be displayed on the display 3c.

Figure 25:
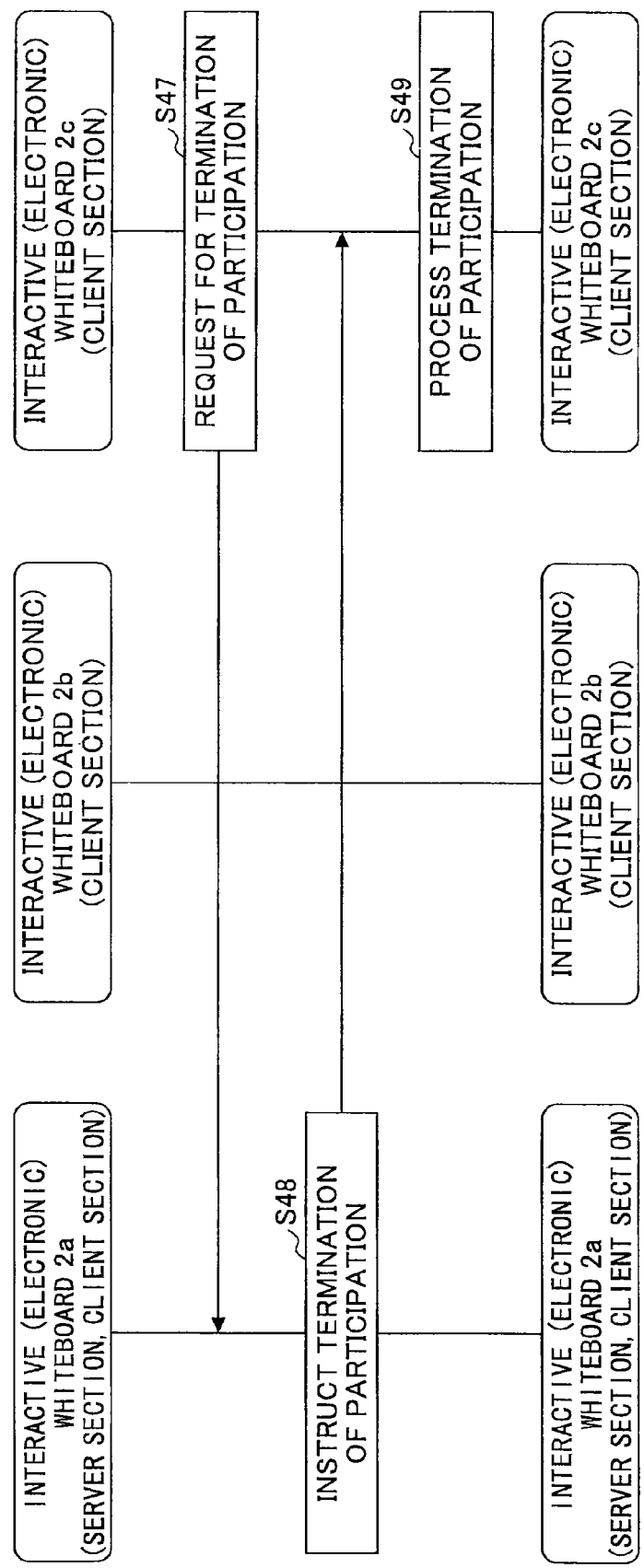
FIG. 25 is a sequence diagram of an example flow of ending the participation in the remote sharing process.

Next, a process of terminating the participation in the remote shared process is described with reference to the participation device 2c. FIG. 25 is a sequence diagram of terminating the participation.

In step S47, when the user of the participation device 2c sends a request for terminating the participation in the remote sharing process using an input device such as the touch panel, the remote participation processing section 62 in the client section 20 of the participation device 2c sends the request for terminating the participation to the communication control section 70 (the remote connection request receive section 71) in the server section 90 of the host device 2a.

The remote connection request receive section 71 of the host device 2a receives the request for terminating the participation from the interactive (electronic) whiteboard (participation device) 2c, and transmits the request for terminating the participation along with the IP address of the interactive (electronic) whiteboard (participation device) 2c to the remote connection processing section 81. The remote connection processing section 81 deletes the participation location information of the interactive (electronic) whiteboard 2c (i.e., the IP address of the interactive (electronic) whiteboard 2c and the name of the location where the interactive (electronic) whiteboard 2c is installed) from the participation location management table 820, and notifies the remote connection result transmission section 72 of the IP address of the interactive (electronic) whiteboard 2c and the deletion of the participation location information.

In step S48, the remote connection result transmission section 72 (the communication control section 70) notifies the communication control section 60 (the remote participation processing section 62) in the client section 20 of the participation device 2c via the communication network 9 of the termination of the participation in the remote sharing process.

In step S49, the remote participation processing section 62 in the client section 20 of the participation device 2c cuts off the communication for the remote sharing process. By doing this, the process of terminating the participation in the remote shared process is completed.

As described above in detail, in the interactive (electronic) whiteboard 2 according to an embodiment, the stroke data are recorded (stored) in an electronic file along with the image data of the background image (D) and the image data of the stroke image (B) by the file conversion section 43. The electronic file can be stored, for example, in the file management section 320 in the interactive (electronic) whiteboard 2, the USB memory 5 connected to the interactive (electronic) whiteboard 2 (display 3), etc.

Further, the electronic file can be transmitted to another personal computer and the like using, for example, e-mail. The stored electronic file can be read by the file input section 42a and the like, so that the stroke data are extracted therefrom. Therefore, it becomes possible to reproduce the stroke, which is drawn by an input operation by a user with the electronic pen 4 or the like, based on the stroke data by the stroke processing section 32. Further, it becomes possible to perform a process on the stroke by editing the stroke data by an input operation.

Further, in the interactive (electronic) whiteboard 2 according to an embodiment, a PDF format is employed as the format of the electronic file that records (stores) the stroke data and the like.

By employing the PDF format, for example, the electronic file can be transferred to a personal computer or the like which is outside of the interactive (electronic) whiteboard 2, so that a general-purpose PDF viewer (viewing software) can generate (reproduce) the electronic file, thereby improving the general versatility. However, as the format of the electronic file, it should be noted that the present invention is not limited to the PDF format, so that any appropriate format may also be used in the present invention.

Further, in the interactive (electronic) whiteboard 2 according to an embodiment, when the electronic file is stored in the file management section 320, an identification code in association with the electronic file is attached to the electronic file, so that the stored electronic file is managed by using the identification code. By doing this, it becomes easier to search for and read a desired electronic file from among the electronic files stored in the file management section 320 by using the identification code.

Further, in the description, the interactive (electronic) whiteboard is described as an example of the image processing apparatus in the present invention. However, it should be noted that the present invention is not limited to this configuration. For example, the image processing apparatus in the present invention may include, but not limited to, digital signage, a telestrator which is used in sports or weather forecasting, a remote image (video) diagnosis device, etc. Further, a laptop PC is described as an example of an information processing terminal.

However, the present invention is not limited to this configuration. For example, as an example of an information processing terminal may include any terminal that can provide image frame such as, a desktop PC, a tablet PC, a Personal Digital Assistant (PDA), a digital video camera, a digital camera, a game machine, etc. Further, the communication network in the description includes, for example, the Internet, a Local Area Network (LAN), a cellular phone communication network, etc. Further, the USB memory is employed as an example of a recording medium in the description. However, the example of the recording medium is not limited to the USB memory. For example, any other recording medium such as an SD card may be used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for displaying an image, which displays a stroke that is drawn by an input operation, by superimposing the image on a background image, on a display device, the apparatus comprising:
   circuitry configured to:
      create an electronic document including stroke data including a drawing position for reproducing the stroke, image data of a stroke image for displaying the stroke, image data of the background image, and bibliographical information including version information of the apparatus;
      extract the stroke data and the image data of the background image from the electronic document when the circuitry determines that a page of the electronic document can be restored from the stroke data, based on the bibliographical information included in the electronic document;
      generate image data of an image that is different from the stroke image, for displaying the stroke from the stroke data;
      display the image on the display device so as to be superimposed on the background image;
      extract the image data of the stroke image and the image data of the background image from the electronic document when the circuitry determines that the page of the electronic document cannot be restored from the stroke data, based on the bibliographical information included in the electronic document; and
      display the stroke image on the display device so as to be superimposed on the background image.

2. The apparatus according to claim 1, wherein the circuitry is further configured to:
   apply an identification code input by a user with the use of a drawing device or an identification code defined in advance, to the electronic document when storing the electronic document in a storage; and
   search for the electronic document stored in the storage by using the identification code.

3. The apparatus according to claim 2, wherein
   when the input identification code is determined to be correct, the circuitry is further configured to determine whether the electronic document, which is associated with the input identification code, is stored in the storage;

when the input identification code is determined to be incorrect, and when the electronic document associated with the input identification code is determined not to be stored in the storage, the circuitry is further configured to display an error message on the display device; and when the electronic document associated with the input identification code is determined to be stored in the storage, the circuitry is further configured to display a list of the electronic documents associated with the input identification code on the display device.

4. The apparatus according to claim 3, wherein the circuitry is further configured to determine a storage location of the electronic document in the storage, according to the identification code.

5. The apparatus according to claim 1, wherein the circuitry is further configured to:

extract the stroke data and the image data of the background image from the electronic document when the circuitry successfully reads the electronic document;

generate image data of the image that is different from the stroke image, for displaying the stroke from the stroke data;

display the image on the display device so as to be superimposed on the background image;

extract the image data of the stroke image and the image data of the background image from the electronic document when the circuitry fails to read the electronic document; and display the stroke image on the display device so as to be superimposed on the background image.

6. A method for displaying an image, which displays a stroke that is drawn by an input operation, by superimposing the image on a background image, on a display device, the method comprising:

creating, by circuitry, an electronic document including stroke data including a drawing position for reproducing the stroke, image data of a stroke image for displaying the stroke, image data of the background image, and bibliographical information including version information of the apparatus;

extracting, by the circuitry, the stroke data and the image data of the background image from the electronic document when the circuitry determines that a page of the electronic document can be restored from the stroke data, based on the bibliographical information included in the electronic document;

generating, by the circuitry, image data of an image that is different from the stroke image, for displaying the stroke from the stroke data;

displaying, by the circuitry, the image on the display device so as to be superimposed on the background image;

extracting, by the circuitry, the image data of the stroke image and the image data of the background image from the electronic document when the circuitry determines that the page of the electronic document cannot be restored from the stroke data, based on the bibliographical information included in the electronic document; and displaying, by the circuitry, the stroke image on the display device so as to be superimposed on the background image.

7. The method according to claim 6, further comprising:

applying, by the circuitry, an identification code input by a user with the use of a drawing device or an identification code defined in advance, to the electronic document when storing the electronic document in a storage; and searching, by the circuitry, for the electronic document stored in the storage by using the identification code.

8. The method to claim 7, further comprising:

when the input identification code is determined to be correct, determining, by the circuitry, whether the electronic document, which is associated with the input identification code, is stored in the storage;

when the input identification code is determined to be incorrect, and when the electronic document associated with the input identification code is determined not to be stored in the storage, displaying, by the circuitry, an error message on the display device; and when the electronic document associated with the input identification code is determined to be stored in the storage, displaying, by the circuitry, a list of the electronic documents associated with the input identification code on the display device.

9. The method to claim 8, further comprising:

determining, by the circuitry, a storage location of the electronic document in the storage, according to the identification code.

10. The method to claim 6, further comprising:

extracting, by the circuitry, the stroke data and the image data of the background image from the electronic document when the circuitry successfully reads the electronic document;

generating, by the circuitry, image data of the image that is different from the stroke image, for displaying the stroke from the stroke data;

displaying, by the circuitry, the image on the display device so as to be superimposed on the background image;

extracting, by the circuitry, the image data of the stroke image and the image data of the background image from the electronic document when the circuitry fails to read the electronic document; and displaying, by the circuitry, the stroke image on the display device so as to be superimposed on the background image.

* * * * *